United States Patent
Shirakawa

(10) Patent No.: US 9,645,230 B2
(45) Date of Patent: May 9, 2017

(54) DETECTION AND RANGING APPARATUS

(71) Applicant: FUJITSU LIMITED, Kawasaki-shi, Kanagawa (JP)

(72) Inventor: Kazuo Shirakawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 314 days.

(21) Appl. No.: 14/464,386

(22) Filed: Aug. 20, 2014

(65) Prior Publication Data

US 2015/0070204 A1 Mar. 12, 2015

(30) Foreign Application Priority Data

Sep. 6, 2013 (JP) ................. 2013-185466

(51) Int. Cl.
G01S 13/34 (2006.01)
G01S 7/35 (2006.01)
(Continued)

(52) U.S. Cl.
CPC ............ G01S 7/354 (2013.01); G01S 7/023 (2013.01); G01S 13/325 (2013.01); G01S 13/34 (2013.01); G01S 13/345 (2013.01); G01S 13/584 (2013.01)

(58) Field of Classification Search
CPC ...... G01S 13/325; G01S 13/34; G01S 13/345; G01S 13/584; G01S 7/023; G01S 7/354
(Continued)

(56) References Cited

U.S. PATENT DOCUMENTS

2006/0181448 A1 8/2006 Natsume et al.
2007/0018886 A1 1/2007 Watanabe et al.
(Continued)

FOREIGN PATENT DOCUMENTS

EP 1840595 A2 10/2007
EP 2045612 A2 4/2009
(Continued)

OTHER PUBLICATIONS

Extended European Search Report (EESR) of European Patent Application No. 14181338.6 dated Jan. 28, 2015.
(Continued)

Primary Examiner — Timothy A Brainard
(74) Attorney, Agent, or Firm — Fujitsu Patent Center

(57) ABSTRACT

A detection and ranging apparatus includes a probe signal generating unit that generates a probe signal according to a first modulation method, a transmitting unit that transmits the generated probe signal, a receiving unit that receives a signal including at least one of a reflection signal and an interference signal according to a second modulation method, a demodulating unit that demodulates the reception signal according to a method corresponding to at least one of the first modulation method and the second modulation method, an interference signal detecting unit that detects the interference signal from the demodulated signal, an interference signal identifying unit that identifies specifications and a delay amount of the interference signal from the demodulated signal, and an interference signal removing unit that removes the interference signal within the reception signal by using the identified specifications and the identified delay amount of the interference signal.

11 Claims, 23 Drawing Sheets

(51) Int. Cl.
*G01S 7/02* (2006.01)
*G01S 13/32* (2006.01)
*G01S 13/58* (2006.01)

(58) Field of Classification Search
USPC ........................................................ 342/128
See application file for complete search history.

(56) References Cited

U.S. PATENT DOCUMENTS

| | | |
|---|---|---|
| 2007/0188373 A1 | 8/2007 | Shirakawa et al. |
| 2009/0079617 A1 | 3/2009 | Shirakawa et al. |
| 2009/0121918 A1 | 5/2009 | Shirai et al. |
| 2010/0159865 A1 | 6/2010 | Fudge |
| 2011/0065409 A1 | 3/2011 | Kenington |
| 2013/0083943 A1* | 4/2013 | Sorensen ............... H04R 3/005 381/92 |

FOREIGN PATENT DOCUMENTS

| | | |
|---|---|---|
| EP | 2390679 A1 | 11/2011 |
| JP | 11-166968 | 6/1999 |
| JP | 2001-074830 | 3/2001 |
| JP | 2006-220624 | 8/2006 |
| JP | 2006-300550 | 11/2006 |
| JP | 2007-218690 | 8/2007 |
| JP | 2009-080024 | 4/2009 |
| JP | 2009-121826 | 6/2009 |

OTHER PUBLICATIONS

JPOA—Office Action dated Jan. 24, 2017 for corresponding Japanese Patent Application No. 2013-185466, with machine translation of the Office Action.

* cited by examiner

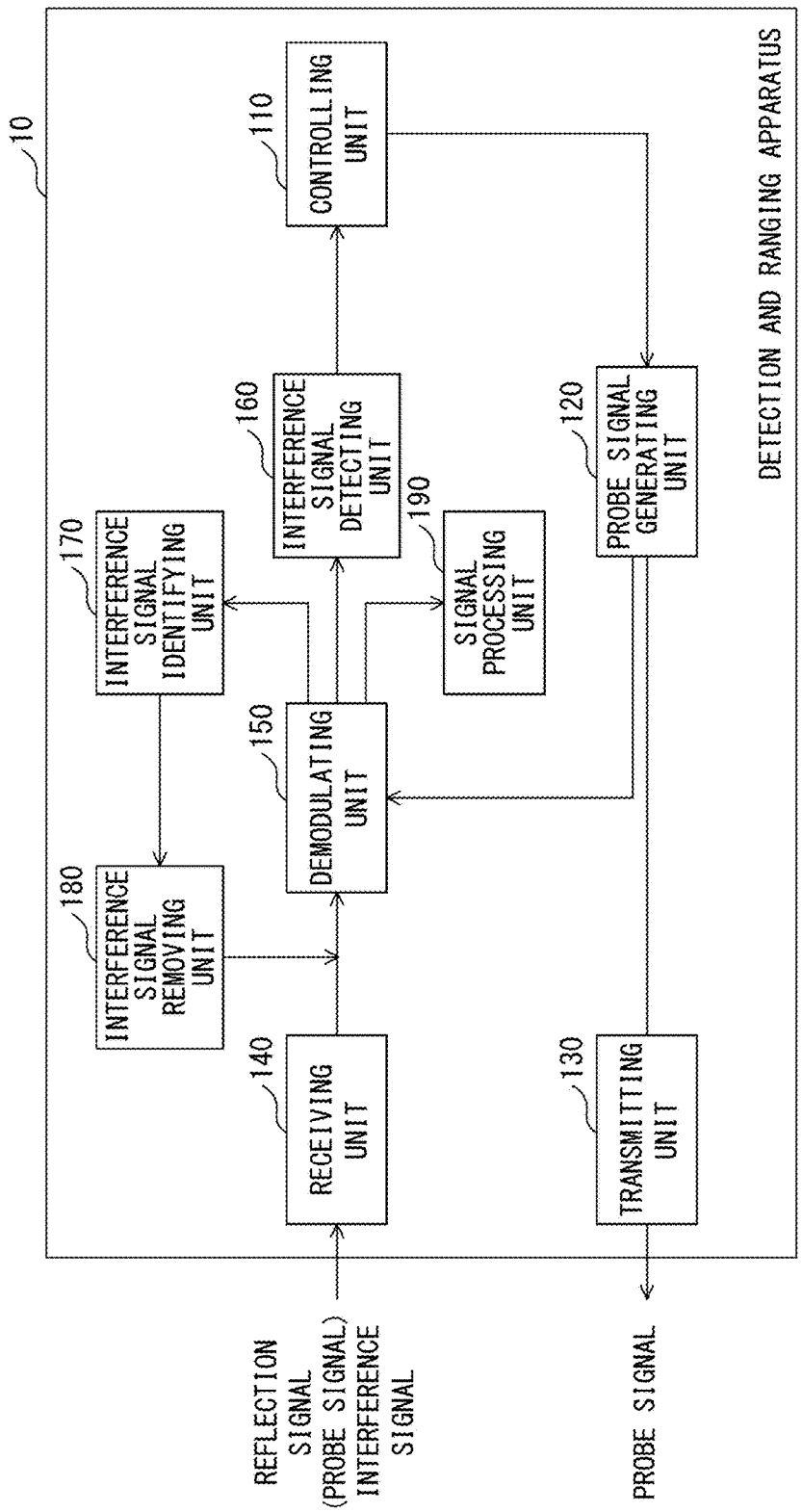
F I G. 2

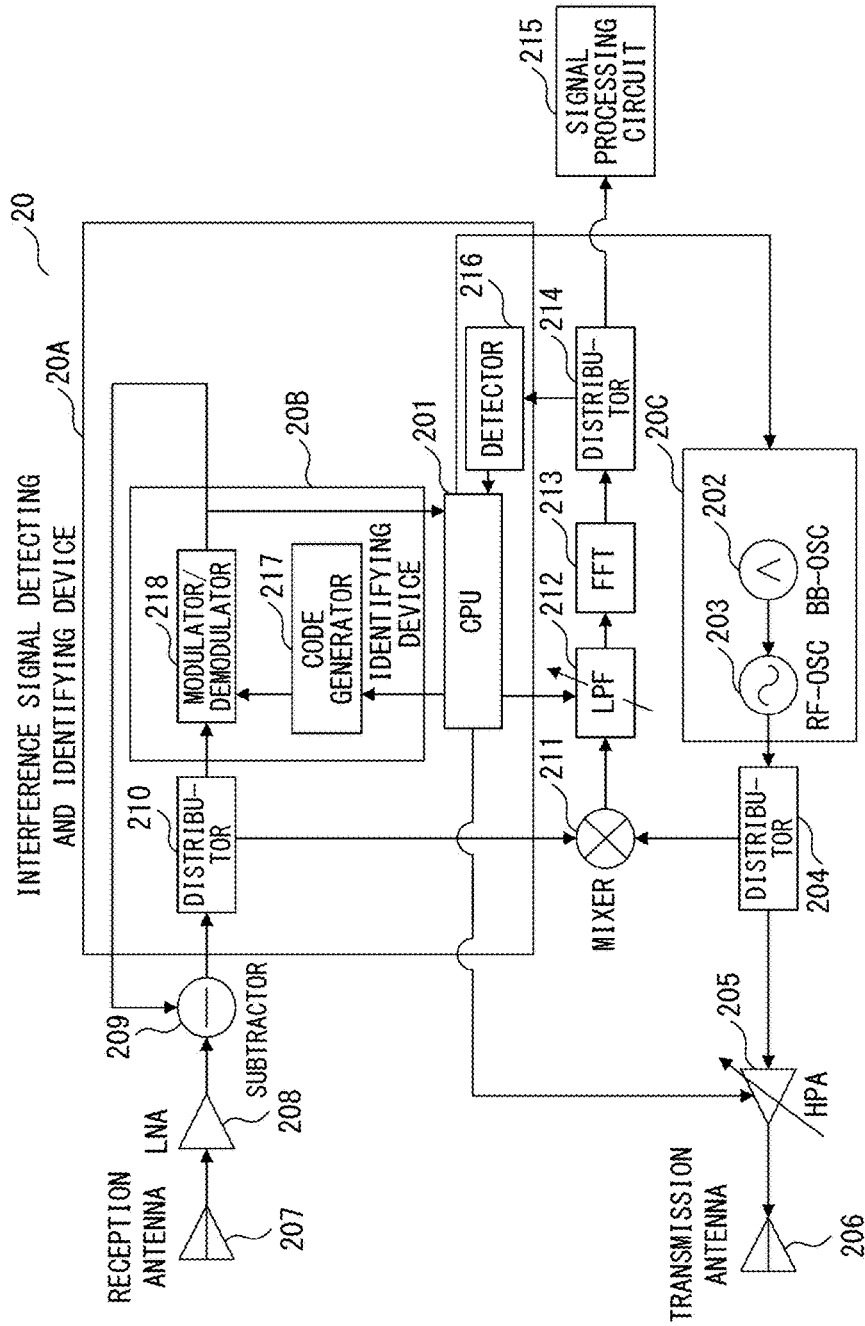
F I G. 4

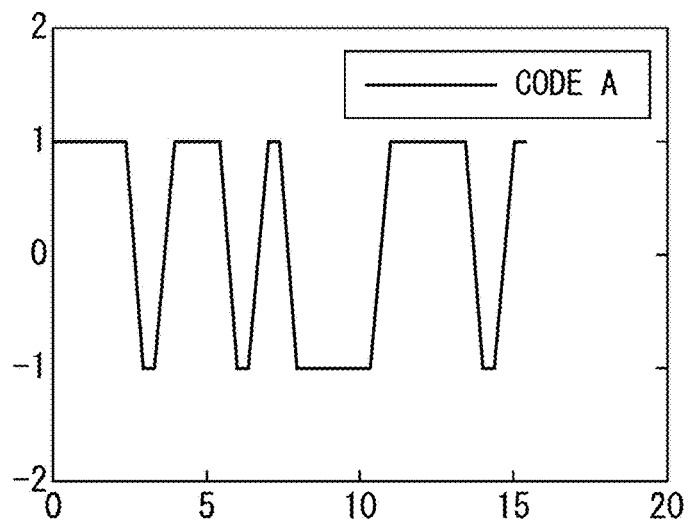
F I G. 7 A

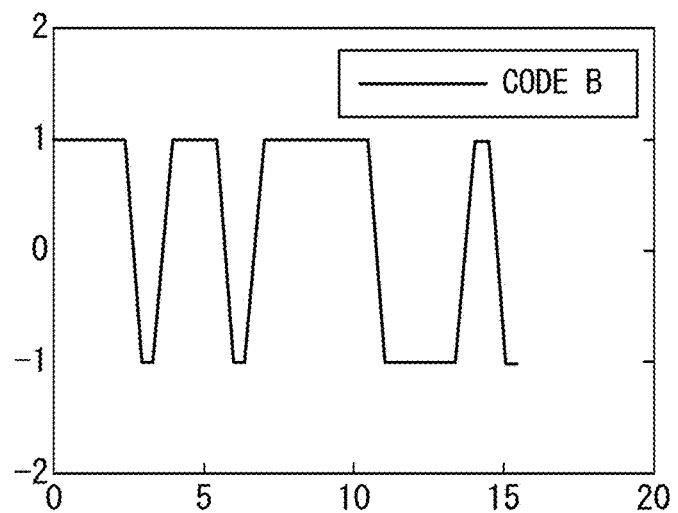
F I G. 7B

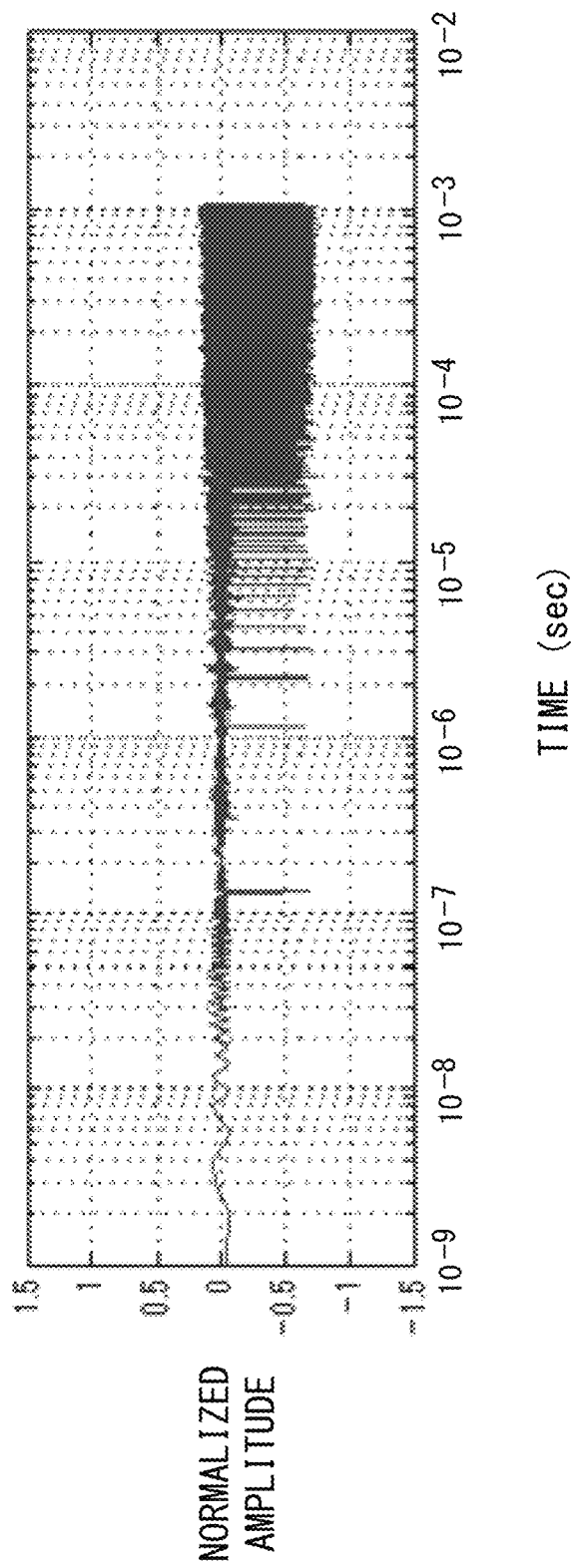
F I G. 11B

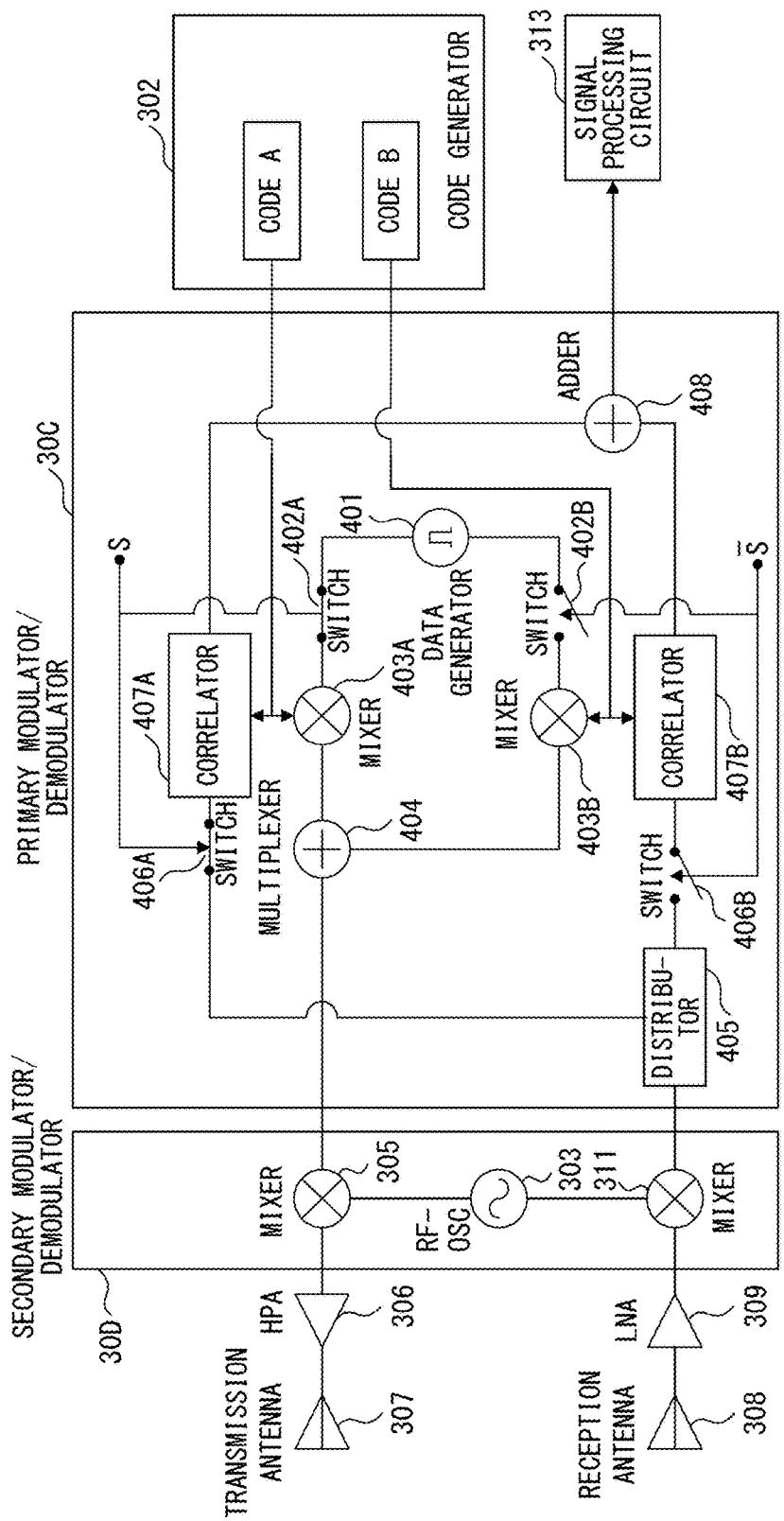
F I G. 14

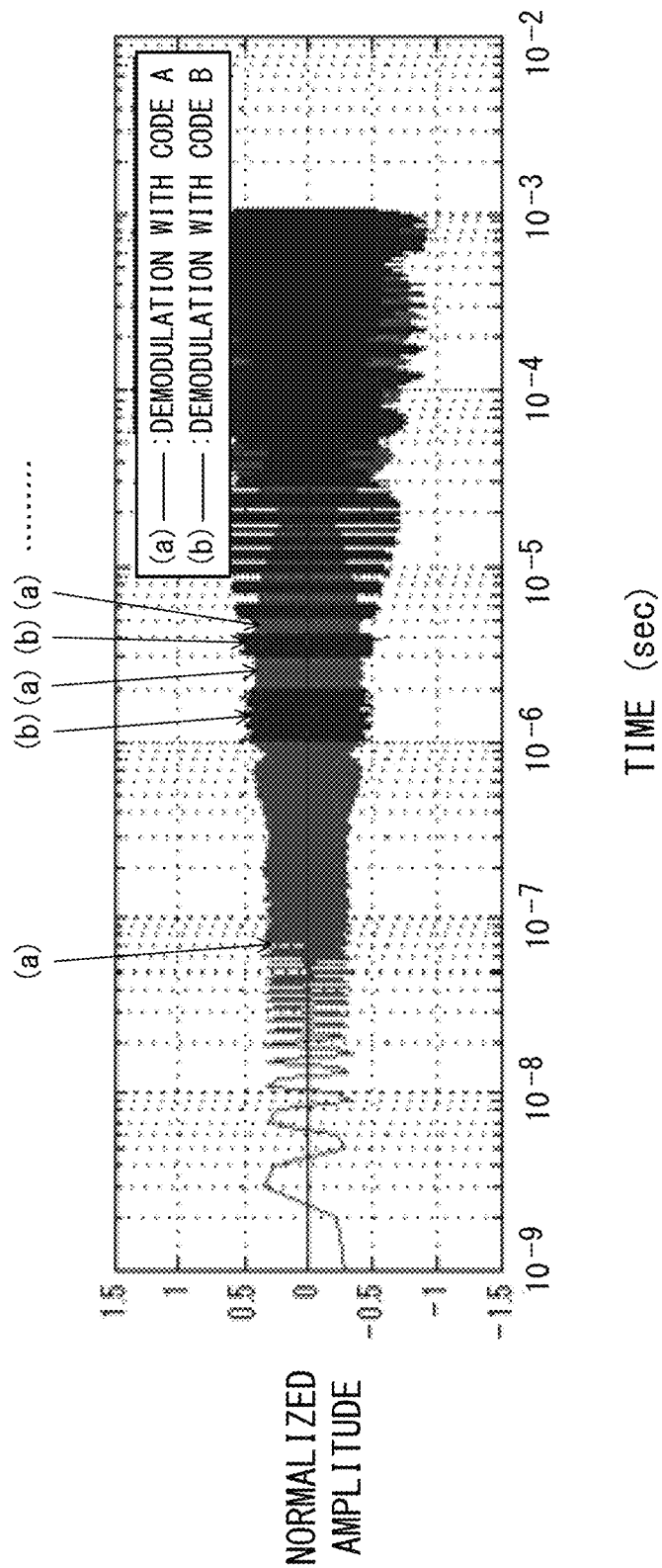
F I G. 15

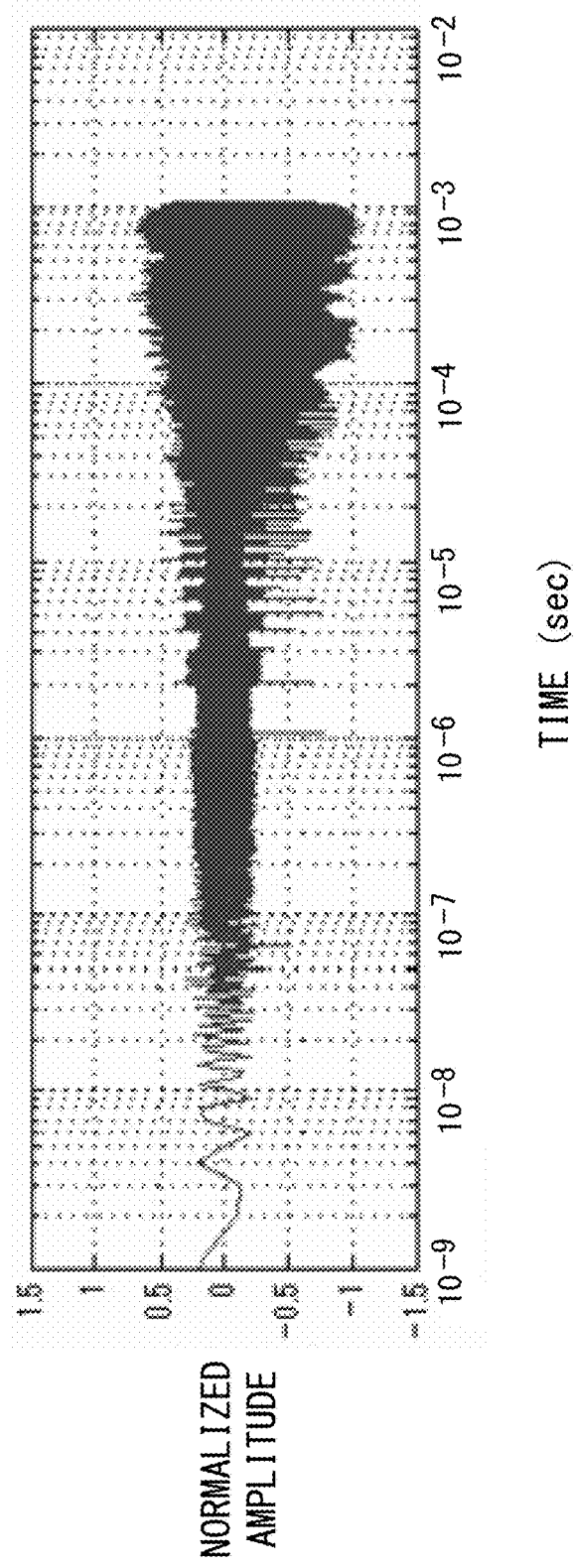
F I G. 17B

DETECTION AND RANGING APPARATUS

CROSS-REFERENCE TO RELATED APPLICATIONS

This application is based upon and claims the benefit of priority of the prior Japanese Patent Application No. 2013-185466, filed on Sep. 6, 2013, the entire contents of which are incorporated herein by reference.

FIELD

The embodiments discussed herein are related to a detection and ranging apparatus.

BACKGROUND

A detection and ranging apparatus transmits a probe signal and receives an echo signal generated in such a way that the probe signal is reflected by the target which is a detection target. The detection and ranging apparatus thereby detects a target and measures a relative distance in an eye direction (hereinafter referred to simply as a "distance") up to the target and a relative velocity in the eye direction (hereinafter referred to simply as a "velocity") of the target. Examples of the detection and ranging apparatus include a radar apparatus that transmits a radiowave as a probe signal. Such a radar apparatus can be mounted in an automobile and the like. Assume that a target identified by the detection and ranging apparatus is distinguished according to a number k (k=an integer equal to or larger than 1) and a kth target moves in a position by a distance $d_k$ from the detection and ranging apparatus at a velocity $v_k$. At this time, a propagation delay $T_k$ from the detection and ranging apparatus to each target, and a Doppler frequency $\omega_d^k$ for the detection and ranging apparatus with regard to a carrier angular frequency (hereinafter referred to simply as a "frequency" unless otherwise misunderstood) $\omega_c$, and a light velocity $c_0$ are respectively represented by the following expressions (1) and (2).

$$\tau_k = \frac{2d_k}{c_0} \quad (1)$$

$$\omega_d^k = \frac{2\omega_c v_k}{c_0} \quad (2)$$

In an environment where a plurality of the above described detection and ranging apparatuses are present, the detection and ranging apparatus may receive a signal transmitted from a different apparatus as an interference signal in addition to an echo signal from a target. Accordingly, to accurately perform the above described detection and measurement, the detection and ranging apparatuses need to detect a signal (interference signal) transmitted by the different apparatus from a reception signal, to suppress the detected interference signal, and to preferably remove the interference signal. FIG. 1 illustrates an example of a situation where interference occurs between detection and ranging apparatuses.

Radars 1 and 2 illustrated in FIG. 1 are one example of the detection and ranging apparatus. The radars 1 and 2 are radars that use, for example, a probe signal modulated with a Frequency Modulated Continuous Wave (FMCW) method, or a probe signal modulated with a Direct Spectrum Spreading Signal (DSSS) method. The radar 1 transmits a probe signal by using a transmission antenna $A_{T1}$, and receives an echo signal from a target $T^D$ by using a reception antenna $A_{R1}$. Moreover, the radar 2 transmits a probe signal by using a transmission antenna $A_{T2}$, and receives an echo signal from the target $T^U$ by using a reception antenna $A_{R2}$.

As described above, the radar 1 receives, via the reception antenna $A_{R1}$, an echo signal (desired signal) $v_{RX}^D(t)$ generated in such a way that the probe signal transmitted via the transmission antenna $A_{T1}$ is reflected by the target $T^D$. Then, the radar 1 detects the target $T^D$ based on the received desired signal $v_{RX}^D(t)$, and measures feature amounts such as a distance to the target $T^D$ and a velocity of the target $T^D$. However, as illustrated in the example illustrated in FIG. 1, the radar 1 can possibly receive, via the reception antenna $A_{R1}$, a signal (interference signal) $V_{RX}^U(t)$, which is generated in such a way that the probe signal transmitted via the transmission antenna $A_{T2}$ of the radar 2 is reflected by the non-target $T^U$, along with the desired signal $V_{RX}^D(t)$. The superscript "(D)" represents "Desired", whereas the superscript "U" represents "Undesired". Assuming that an additive white Gaussian noise is n(t), the signal v(t) received by the reception antenna $A_{R1}$ is represented by the following expression (3).

$$v(t) = v_{RX}^D(t) + v_{RX}^U(t) + n(t) \quad (3)$$

In order that the radar 1 may accurately measure the feature amounts of the target $T^D$, it is desired to remove an undesired signal $V_{RX}^U(t)$ from a reception signal v(t) in the expression (3).

An interference detecting apparatus for use in a radar apparatus, which randomly changes set channels of output signals at certain timing and detects an abnormality caused by interference based on a plurality of measurement results in the changed different channels, is known.

Additionally, an FMCW radar that transmits a radar wave using a frequency different from an interference wave by changing a central frequency of a voltage control oscillator when an absolute value of a change amount of sampling data obtained by sampling a beat signal is larger than a set threshold value is known.

PRIOR ART DOCUMENTS

Patent Documents

[Patent Document] Japanese Laid-open Patent Publication No. H11-166968
[Patent Document] Japanese Laid-open Patent Publication No. 2006-300550

SUMMARY

According to an aspect of the embodiments, a detection and ranging apparatus includes a probe signal generating unit, a transmitting unit, a receiving unit, a demodulating unit, an interference signal detecting unit, an interference signal identifying unit, and an interference signal removing unit. The probe signal generating unit is configured to generate a probe signal according to a first modulation method. The transmitting unit is configured to transmit the probe signal generated by the probe signal generating unit. The receiving unit is configured to receive a signal including at least one of a reflection signal generated in such a way that the probe signal transmitted from the transmitting unit is reflected by a target and an interference signal according to a second modulation method. The demodulating unit is configured to demodulate the reception signal received by the receiving unit according to a method corresponding to at least one of the first modulation method and the second modulation method. The interference signal detecting unit is configured to detect the interference signal from the signal demodulated by the demodulating unit. The interference signal identifying unit is configured to identify specifications and a delay amount of the interference signal from the signal demodulated by the demodulating unit. The interference signal removing unit is configured to remove the interference signal within the reception signal by using the specifications and the delay amount of the interference signal which are identified by the interference signal identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a functional configuration of a detection and ranging apparatus according to an embodiment;

FIG. 4 schematically illustrates a hardware configuration of a detection and ranging apparatus according to a first embodiment;

FIG. 7A illustrates an example of a pair of complimentary codes;

FIG. 7B illustrates an example of a pair of complimentary codes;

FIG. 11B illustrates an example of results of a correlation computation performed by the modulator/demodulator in the first embodiment;

FIG. 14 schematically illustrates a portion that includes a hardware configuration example of a primary modulator/demodulator and is implemented by removing an interference detecting and avoiding mechanism from the detection and ranging apparatus according to the second embodiment and;

FIG. 15 illustrates an example of a real part of an interference signal for which complimentary code demodulation is performed by the detection and ranging apparatus according to the second embodiment;

FIG. 17B illustrates an example illustrating a real part of an output signal from the concatenator of the second embodiment;

DESCRIPTION OF EMBODIMENTS

Figure 1:
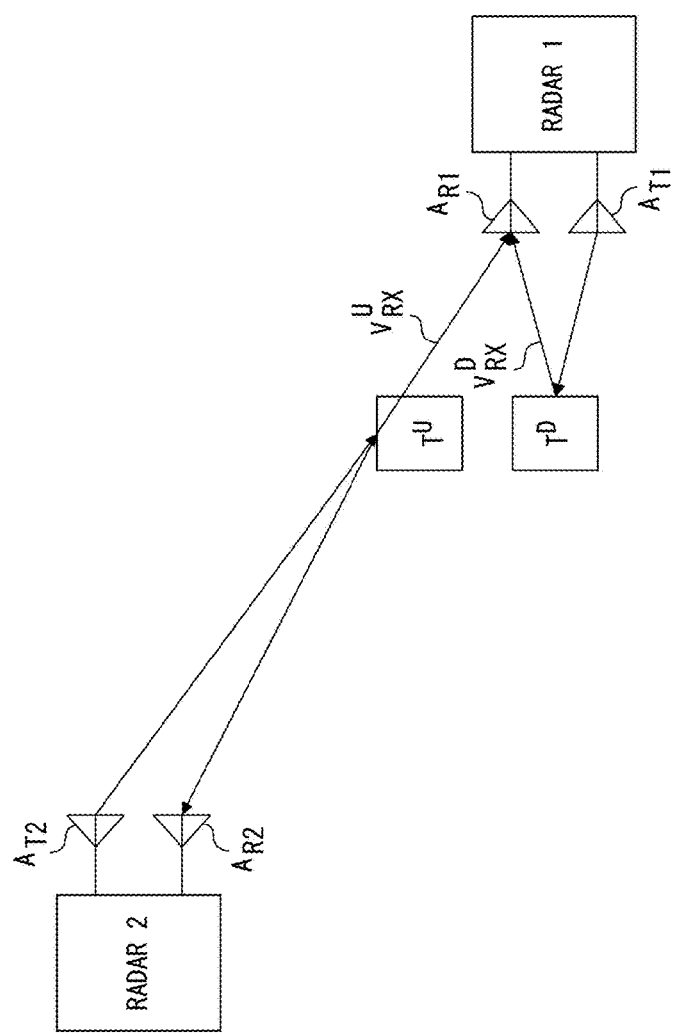
FIG. 1 illustrates an example of a situation where interference occurs between detection and ranging apparatuses.

Embodiments for carrying out the invention are described in detail below with reference to the drawings.

As described above, a detection and ranging apparatus having autonomy, such as a radar and the like, detects a target and measures feature amounts of the target according to only a reflection signal of a probe signal transmitted from the detection and ranging apparatus. Therefore, in a situation where a different detection and ranging apparatus is present in an observation space and an interference component caused by a probe signal transmitted by the different detection and ranging apparatus is mixed into an observation range, there is a possibility that the detection and ranging apparatus cannot accurately identify a target due to an influence of the interference component.

Specifically, power of a desired reflection signal attenuates in proportion to the fourth power of a distance to a target, whereas power of an undesired interference signal attenuates in proportion to the square of a distance from an interference source. Therefore, a relationship such that "a power level of an undesired interference signal>>a power level of a desired reflection signal" can be possibly satisfied. As a result, if no measures are taken to remove an interference signal from a reception signal, there is a possibility that a distinction cannot be made between a desired reflection signal and an undesired interference signal in a reception signal including the reflection signal and the interference signal, or that the desired reflection signal is masked by the undesired interference signal. Accordingly, it is needed to sufficiently suppress an interference component mixed into an observation range, and preferably, to remove the interference component from the reception signal (hereinafter, the word "remove" also includes the meaning of "suppress" in order to clarify an explanation).

Additionally, in recent years, an FMCW method has been used as a modulation method in a car-mounted radar which is one example of a detection and ranging apparatus. However, with the development of Intelligent Transport System (ITS), also an application of a radar that is installed in an infrastructure such as an intersection, a crossing and the like and detects pedestrians and the like has been experimentally studied, and a DSSS method having a high resolution is employed as a modulation method in such a radar. Therefore, the demand for establishing a method for detecting an interference signal from a different radar and for removing the detected interference signal from a reception signal in an environment where radars that use different modulation methods such as an FMCW method and a DSSS method coexist can be possibly made.

As the method for removing an interference signal, for example, a method by which a detection and ranging apparatus obtains information about a probe signal of a different detection and ranging apparatus in some way and removes an interference component from a reception signal based on the obtained information is conceivable. However, an additional apparatus such as a communication apparatus or the like that links between cars, or between a road and a vehicle becomes essential to individually obtain information about a probe signal of a different detection and ranging apparatus correctly using a different modulation method in a situation where the plurality of detection and ranging apparatuses that respectively use different modulation methods coexist in an observation space. As a result, the entire system configuration becomes complicated, leading to an increase in a cost of a signal process, and an arbitration process between apparatuses. Moreover, it is difficult to apply the above described method that takes a lot of time to obtain information about a probe signal of a different detection and ranging apparatus, for example, to a radar for ITS, which demands a quick response (especially, it is less realistic to build such a system inclusive of an infrastructure in a thinly populated area and the like).

Additionally, it is difficult to build a mathematical model for interference between radars that use different modulation methods, and experimental data of occurrences of some interference have just started to be accumulated in an international project mainly in Europe. Therefore, also a method for detecting and removing such an interference signal based on theoretical grounds has not been established yet.

In an embodiment, a mathematical model for interference between radars that use different modulation methods is derived as grounds on which an interfered radar can detect an interference signal and remove the detected interference signal. Moreover, a detection and ranging apparatus and an interference signal removing method based on the derived mathematical model are proposed.

FIG. 2 illustrates an example of a functional configuration of the detection and ranging apparatus according to the embodiment. As illustrated in FIG. 2, the detection and ranging apparatus 10 includes a controlling unit 110, a probe signal generating unit 120, a transmitting unit 130, a receiving unit 140, a demodulating unit 150, an interference signal detecting unit 160, an interference signal identifying unit 170, an interference signal removing unit 180, and a signal processing unit 190.

The controlling unit 110 controls operations of the entire detection and ranging apparatus 10. The probe signal generating unit 120 generates a probe signal modulated with a specified modulation method according to an instruction from the controlling unit 110. For the sake of convenience, the specified modulation method that the detection and ranging apparatus 10 uses to generate the probe signal is hereinafter referred to as a first modulation method. Examples of the first modulation method include an FMCW method and a DSSS method. The probe signal generating unit 120 transmits the generated probe signal to the transmitting unit 130. The transmitting unit 130 receives the probe signal from the probe signal generating unit 120, and transmits the received probe signal to the outside of the detection and ranging apparatus 10. Moreover, the probe signal generating unit 120 transmits the generated probe signal to the demodulating unit 150. Alternatively, the probe signal generating unit 120 transmits a code used to generate the probe signal to the demodulating unit 150. For the sake of convenience, the probe signal or the code transmitted from the probe signal generating unit 120 to the demodulating unit 150 is hereinafter referred to as a signal for demodulation.

The receiving unit 140 receives an echo signal (sometimes referred to as a desired signal or a reflection signal hereinafter) generated in such a way that the probe signal transmitted from the transmitting unit 130 is reflected by a target. Moreover, the receiving unit 140 may receive a signal (sometimes referred to as an undesired signal or an interference signal hereinafter) generated in such a way that the probe signal transmitted from the different detection and ranging apparatus is reflected ("reflected" is not essential, but handled as being reflected for the sake of convenience) by a non-target or the like. The probe signal transmitted from the different detection and ranging apparatus is a probe signal modulated with the second modulation method, which is different from the probe signal transmitted from the detection and ranging apparatus 10. For example, in a case where the first modulation method is an FMCW method, the second modulation method is a different modulation method such as a DSSS method. Alternatively, in a case where the first modulation method is the DSSS method, the second modulation method is a different modulation method such as the FMCW method. The receiving unit 140 transmits, to the demodulating unit 150, a reception signal that may include an interference signal in addition to a reflection signal.

The demodulating unit 150 demodulates the reception signal received from the receiving unit 140 with a method (demodulation method) corresponding to the first modulation method by using the signal for demodulation, which are received from the probe signal generating unit 120. The demodulating unit 150 transmits the demodulation signal to the interference signal detecting unit 160.

The interference signal detecting unit 160 detects the interference signal from the demodulation signal received from the demodulating unit 150. When the interference signal is detected by the interference signal detecting unit 160, the controlling unit 110 instructs the transmitting unit 130 to stop a transmission of a probe signal (or change a transmission power level). "Stopping a transmission" can include reducing a transmission power level to 0 by controlling a decrease of the transmission power level, namely, the "changing a transmission power level". Accordingly, "stopping a transmission" is described by assuming that "stopping a transmission" broadly includes not only the reducing a transmission power level to zero but "changing a transmission power level" in order to clarify the explanation.

The transmitting unit 130 stops the transmission of the probe signal according to an instruction from the controlling unit 110. The receiving unit 140 receives a signal in a state where the transmission of the probe signal from the transmitting unit 130 is stopped. The demodulating unit 150 demodulates the signal received by the receiving unit 140 with a method corresponding to the second modulation method, and transmits the demodulation signal to the interference signal identifying unit 170.

The interference signal identifying unit 170 identifies specifications of the interference signal by using the signal received from the demodulating unit 150, namely, the reception signal demodulated with the method (demodulation method) corresponding to the second modulation method. It can be said that the identified specifications of the interference signal are those of the probe signal that the different detection and ranging apparatus generates with the second modulation method. When the specifications of the interference signal are identified by the interference signal identifying unit 170, the controlling unit 110 instructs the transmitting unit 130 to restart the transmission of the probe signal (or change the transmission power level). "Restarting a transmission" can include restoring a transmission power level to the power level before stopping the transmission by controlling an elevation of the transmission power level, namely, "changing a transmission power level". Therefore, the "stopping a transmission" is described below by assuming that the "restarting a transmission" broadly includes not only restoring a transmission power level to the power level before stopping the transmission but "changing a transmission power level" in order to clarify the explanation.

The transmitting unit 130 restarts the transmission of the probe signal according to an instruction from the controlling unit 110. The demodulating unit 150 demodulates the signal received by the receiving unit 140 with the methods corresponding to the first and the second modulation methods after the transmission of the probe signal is restarted. The interference signal identifying unit 170 identifies a delay amount of the interference signal based on the signal received from the demodulating unit 150, namely, the signal demodulated with the methods corresponding to the first and the second modulation methods.

The interference signal removing unit 180 generates a copy of the interference signal according to the specifications and the delay amount of the interference signal, which are identified by the interference signal identifying unit 170. Before the demodulating unit 150 demodulates the reception signal with the method corresponding to the first modulation method, the interference signal removing unit 180 removes the interference signal (interference component) from the reception signal by subtracting the generated copy of the interference signal from the reception signal received by the receiving unit 140 after the transmission of the probe signal is restarted. The demodulating unit 150 demodulates the reception signal, from which the interference signal is removed by the interference signal removing unit 180, with the method corresponding to the first modulation method.

The signal processing unit 190 detects a target based on the demodulation signal received from the demodulating unit 150, and measures feature amounts of the target. Examples of the feature amounts to be measured include a distance from the detection and ranging apparatus 10 to a target, and a velocity of the target. For example, when an interference signal is not detected by the interference signal detecting unit 160 and when the interference signal is removed by the interference signal removing unit 180, the signal processing unit 190 can receive the demodulation signal from the demodulating unit 150.

Figure 3:
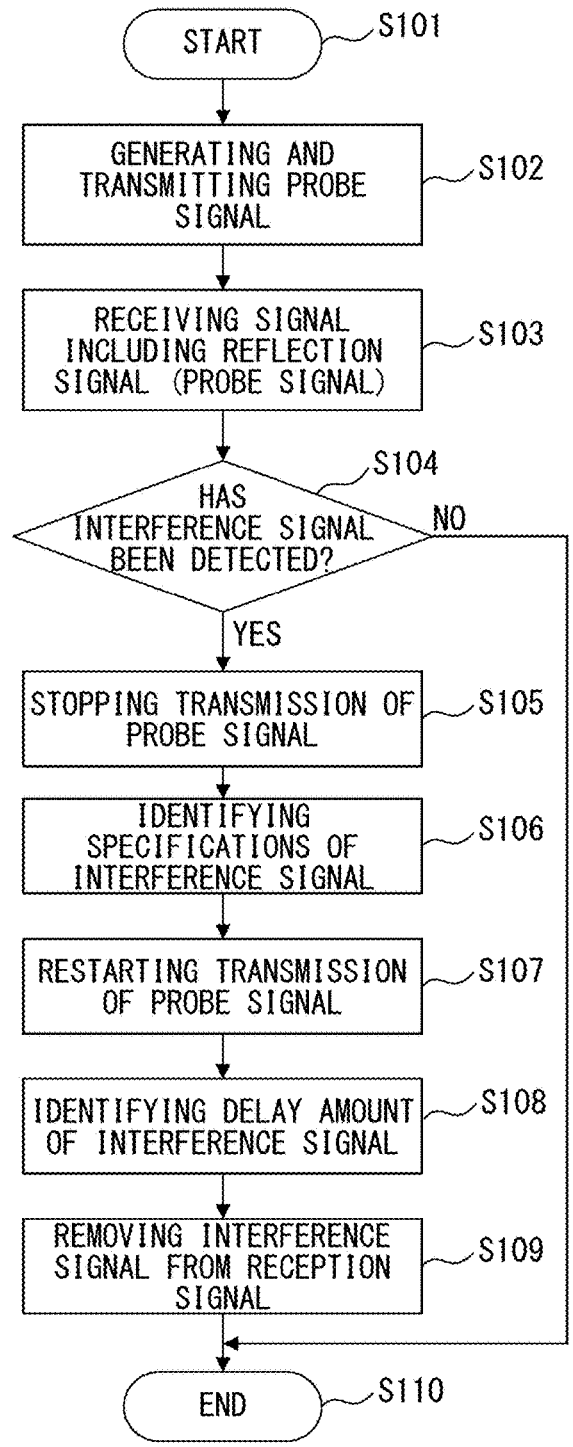
FIG. 3 is an example of a flowchart illustrating an interference component removing method according to an embodiment.

One example of the interference component removing method according to the embodiment, which is executed by the detection and ranging apparatus 10, is described. FIG. 3 is a flowchart illustrating an example of the interference component removing method according to the embodiment.

When a detection and ranging process by the detection and ranging apparatus 10 is started (step S101), the probe signal generating unit 120 generates a probe signal according to an instruction of the controlling unit 110. The transmitting unit 130 transmits the probe signal generated by the probe signal generating unit 120 to the outside of the detection and ranging apparatus 10 (step S102).

The probe signal transmitted by the transmitting unit 130 is reflected by a target. The receiving unit 140 receives a signal including an echo signal generated in such a way that the probe signal is reflected by the target (step S103). The demodulating unit 150 demodulates the reception signal with a method corresponding to the first modulation method.

The interference signal detecting unit 160 receives the demodulation signal from the demodulating unit 150. When the interference signal detecting unit 160 does not detect an interference signal (interference component) from the demodulation signal ("NO" in step S104), a sequence of the interference signal removing process is terminated (step S110).

In the meantime, when the interference signal detecting unit 160 detects the interference signal from the demodulation signal ("YES" in step S104), the transmitting unit 130 stops the transmission of the probe signal according to an instruction from the controlling unit 110 (step S105).

The receiving unit 140 receives the signal including the interference signal while the transmission of the probe signal is being stopped. The demodulating unit 150 demodulates the reception signal with a method corresponding to the second modulation method. The interference signal identifying unit 170 identifies specifications of the interference signal by using the reception signal demodulated by the demodulating unit 150 (step S106). The transmitting unit 130 restarts the transmission of the probe signal according to an instruction from the controlling unit 110 (step S107).

The receiving unit 140 receives the signal including the interference signal after the transmission of the probe signal is restarted. The demodulating unit 150 demodulates the reception signal according to the methods corresponding to the first and the second demodulation methods. The interference signal identifying unit 170 identifies a delay amount of the interference signal by using the reception signal demodulated by the demodulating unit 150 (step S108).

The interference signal removing unit 180 generates a copy of the interference signal according to the specifications and the delay amount of the interference signal, which are identified by the interference signal identifying unit 170. The interference signal removing unit 180 removes the generated copy of the interference signal from the signal received by the receiving unit 140 after the transmission of the probe signal by the transmitting unit 130 is restarted (step S109). Then, the sequence of the interference signal removing process is terminated (step S109). Note that the signal processing unit 190 can detect a target and measure feature amounts of the target by using a reception signal for which the sequence of the interference signal removing process has been executed.

With the interference signal removing method according to the embodiment, in an environment where a plurality of detection and ranging apparatuses that use different modulation methods are present, a signal transmitted by a different detection and ranging apparatus is detected as an interference signal component within a reception signal, and the detected interference signal (a copy of the interference signal) can be removed from the reception signal as described above.

The detection and ranging apparatus according to the embodiment described above with reference to FIG. 2, and the interference signal removing method according to the embodiment described above with reference to FIG. 3 are merely examples, and various changes and improvements can be made as a matter of course.

For example, the interference signal detecting unit 160 can be configured to be able to not only detect an interference signal but identify at least some of specifications of the interference signal. The demodulating unit 150 can be configured to demodulate only a reflection signal from a reception signal received by the receiving unit 140 with a method corresponding to the first modulation method by avoiding an interference signal or spreading a spectrum of the interference signal based on the specifications of the interference signal which are identified by the interference signal detecting unit 160. In such a configuration, the detection and ranging apparatus 10 can detect and remove an interference signal even though the detection and ranging apparatus 10 does not include the interference signal identifying unit 170 and the interference signal removing unit 180.

First and second embodiments are described as specific examples of the detection and ranging apparatus and the interference signal removing method according to the embodiments.

First Embodiment

In the first embodiment, the first modulation method is an FMCW method, whereas the second modulation method is a DSSS method. Namely, the detection and ranging apparatus according to the first embodiment is a radar of an FMCW method, and a different detection and ranging apparatus that exerts an interference signal to the detection and ranging apparatus according to the first embodiment is a radar of a DSSS method. Moreover, in the example illustrated in FIG. 1, the detection and ranging apparatus according to the first embodiment is equivalent to the radar 1, and the different detection and ranging apparatus that exerts the interference signal to the detection and ranging apparatus according to the first embodiment is equivalent to the radar 2. FIG. 1 illustrates, as examples, one target $T^D$ of the radar 1, and one radar 2 that causes an interference signal. However, the detection and ranging apparatus according to the first embodiment can detect a plurality of targets $T^D$, and can measure feature amounts of the plurality of detected targets $T^D$. Moreover, the detection and ranging apparatus according to the first embodiment can detect a plurality of interference signals, and can remove the plurality of detected interference signals from a reception signal.

FIG. 4 schematically illustrates a hardware configuration of the detection and ranging apparatus according to the first embodiment. As illustrated in FIG. 4, the detection and ranging apparatus 20 according to the first embodiment includes a central processing unit (CPU) 201, a baseband oscillator (BB-OSC) 202, a radio frequency oscillator (RF-OSC) 203, a first distributor 204, a high power amplifier (HPA) 205, and a transmission antenna 206. The detection and ranging apparatus 20 also includes a reception antenna 207, a low noise amplifier (LNA) 208, a subtractor 209, a second distributor 210, a mixer 211, a variable low pass filter (LPF) 212, a fast Fourier transform (FFT) circuit 213, a third distributor 214, and a signal processing circuit 215. The detection and ranging apparatus 20 further includes a detector 216, a code generator 217, and a modulator/demodulator 218. Depending on an interference signal removing method to be described below, the detection and ranging apparatus 20 may not include the variable low pass filter 212. In addition, the transmission antenna 206 and the reception antenna 207 can be configured integrally as a transmission/reception antenna.

Additionally, the CPU 201, the detector 216, the code generator 217, the modulator/demodulator 218, and the second distributor 210 among the above described components are included in an interference signal detection and identifying device 20A. The code generator 217 and the modulator/demodulator 218 are included in an interference signal identifying device 20B. The baseband oscillator 202 and the radio frequency oscillator 203 are included in a probe signal generator 20C.

The CPU 201 may correspond to the controlling unit 110. The baseband oscillator 202 and the radio frequency oscillator 203 may correspond to the probe signal generating unit 120. The high power amplifier 205 and the transmission antenna 206 may correspond to the transmitting unit 130. The reception antenna 207 and the low noise amplifier 208 may correspond to the receiving unit 140. The mixer 211 and the variable low pass filter 212 may correspond to the demodulating unit 150. The detector 216 may correspond to the interference signal detecting unit 160. The CPU 201, the detector 216, the code generator 217, and the modulator/demodulator 218 may correspond to the interference signal identifying unit 170. The code generator 217, the modulator/demodulator 218, the subtractor 209, and the variable low pass filter 212 may correspond to the interference signal removing unit 180. The fast Fourier transform circuit 213 and the signal processing circuit 215 may correspond to the signal processing unit 190.

As described above, the detection and ranging apparatus 20 is a radar of an FMCW method. Operations of the detection and ranging apparatus 20 when an interference signal is not received are initially described.

Figure 5:
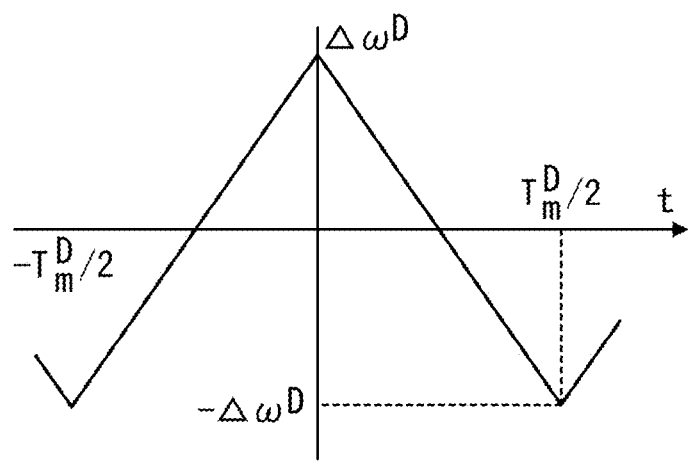
FIG. 5 illustrates an example of an output signal from a baseband oscillator.
Figure 6:
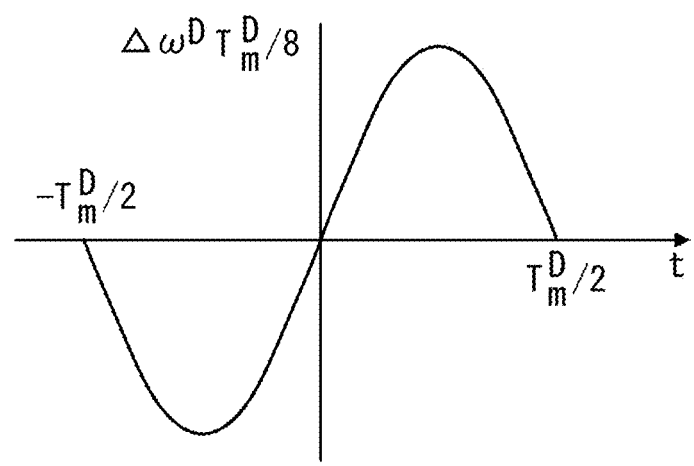
FIG. 6 illustrates an example of a phase of an output signal from a radio frequency oscillator.

In the detection and ranging apparatus 20, an output signal (modulation signal) output from the baseband oscillator 202 is input to the radio frequency oscillator 203 according to an instruction from the CPU 201, and an oscillation frequency of the radio frequency oscillator 203 is thereby changed. Then, the radio frequency oscillator 203 outputs a radio frequency signal with the changed oscillation frequency as a probe signal $V_{TX}^D(t)$. FIG. 5 illustrates an example of an output signal from the baseband oscillator. FIG. 6 illustrates an example of a phase of an output signal from the radio frequency oscillator. To clarify the explanation, a frequency shift $f^D(t)$ of the output signal from the baseband oscillator 202 is defined as the following expression (4).

$$f^D(t) = \begin{cases} \dfrac{4\Delta\omega^D}{T_m^D}t + \Delta\omega^D : & -\dfrac{T_m^D}{2} \le t < 0 \\ -\dfrac{4\Delta\omega^D}{T_m^D}t + \Delta\omega^D : & 0 \le t < \dfrac{T_m^D}{2} \end{cases} \quad (4)$$

As illustrated in FIG. 5, $T_m^D$ represented in the expression (4) is a basic cycle of the modulation signal output from the baseband oscillator 202, and $\Delta\omega^D$ is a single-side maximum frequency shift, double width of which is equivalent to a modulation frequency bandwidth.

When the frequency shift $f^D(t)$ of the output signal from the baseband oscillator 202 is defined as the expression (4), a phase shift $h^D(t)$ of the output signal from the radio frequency oscillator 203 is represented by the following expression (5). Moreover, the probe signal $v_{TX}^D(t)$ is represented by the following expression (6) (a signal amplitude is hereinafter assumed to have been standardized in order to clarify the explanation).

$$h^D(t) = \int_{-\infty}^{t} f^D(x)dx \rightarrow \begin{cases} \frac{2\Delta\omega^D}{T_m^D}t^2 + \Delta\omega^D t: & -\frac{T_m^D}{2} \leq t < 0 \\ -\frac{2\Delta\omega^D}{T_m^D}t^2 + \Delta\omega^D t: & 0 \leq t < \frac{T_m^D}{2} \end{cases} \quad (5)$$

$$v_{TX}^D(t) = \exp\{j[\omega_c^D t + h^D(t)]\} \quad (6)$$

$\omega_c^D$ in the expression (6) indicates a central frequency of the radio frequency oscillator 203, and corresponds to a carrier frequency.

The probe signal output from the radio frequency oscillator 203 is input to the first distributor 204, and the first distributor 204 distributes the input probe signal to the mixer 211 and the high power amplifier 205. The probe signal distributed to the mixer 211 corresponds to the above described signal for demodulation. The high power amplifier 205 amplifies the input probe signal, and the transmission antenna 206 transmits the amplified probe signal to the outside of the detection and ranging apparatus 20.

The reception antenna 207 receives a reflection signal generated in such a way that the probe signal transmitted from the transmission antenna 206 is reflected by the target $T^D$. The reflection signal received by the reception antenna 207 is amplified by the low noise amplifier 208, and input to the mixer 211 via the subtractor 209 and the second distributor 210. In a case where the interference signal removing process according to the embodiment is not executed, a subtraction process by the subtractor 209 is not executed, and the subtractor 209 functions as a through line that outputs the input signal without any change.

The mixer 211 generates a beat signal by mixing the probe signal distributed by the first distributor 204 and the reflection signal distributed by the second distributor 210. The beat signal generated by the mixer 211 can be filtered by the variable low pass filter 212. The fast Fourier transform circuit 213 calculates a frequency spectrum of the beat signal. The signal processing circuit 215 calculates feature amounts of the target $T^D$, such as a distance to the target $T^D$ and a velocity of the target $T^D$, by using the frequency spectrum of the beat signal, which is calculated by the fast Fourier transform circuit 213.

To clarify the explanation, assume that the feature amounts of the target $T^D$ to be detected are a distance and a velocity. Also assume that the target $T^D$ moves in a position of a line-of-sight distance (hereinafter referred to simply as a distance) d at a line-of-sight velocity (hereinafter referred to simply as a velocity) v when viewed from the detection and ranging apparatus 20. Assuming that a delay time between the detection and ranging apparatus 20 and the target $T^D$ is $\tau^D$ and a Doppler frequency shift based on the velocity v is $\omega_d^D$, a demodulation signal (baseband signal) $v^D$ the amplitude of which is standardized is represented by the following expression (7). To clarify the explanation, an additive white noise n(t) is ignored. Moreover, to clarify the explanation, the number of targets $T^D$ is 1. Namely, k represented by the expressions (1) and (2) is assumed to be 1 (k=1).

$$v^D(t) = \quad (7)$$

$$v_{TX}^D(t)v_{RX}^{D,*}(t) = \exp\left\{j\left[\omega_c^D \tau^D - \omega_d^D\left(t - \frac{\tau^D}{2}\right) + h^D(t) - h^D(t-\tau^D)\right]\right\}$$

$V_{RX}^{D,*}$ within the expression (7) represents a complex conjugate of a signal $V_{RX}^D$ received by the reception antenna 207, namely, the reflection signal which is a desired signal. In this way, in the case where the reception antenna 207 receives only the reflection signal reflected by the target $T^D$, the detection and ranging apparatus 20 detects the target $T^D$ based on the demodulation signal represented by the expression (7), and obtains the feature amounts of the target $T^D$.

When the reception antenna 207 receives an interference signal from a different detection and ranging apparatus in the case where the detection and ranging apparatus 20 operates as the above described FMCW radar, the detection and ranging apparatus 20 removes an interference component from the reception signal by executing an interference signal removing process to be described below.

As described above, the different detection and ranging apparatus that causes the interferences signal is the radar of the DSSS method in the first embodiment. Depending on a code sequence used for modulation, various types of radars of the DSSS method may be present. However, a basic principle is the same even though a code sequence used for modulation and the like are changed. Therefore, the radar of the DSSS method as a premise in the first embodiment is assumed to be a radar that transmits a probe signal to be described below.

The radar of the DSSS method as the premise in the first embodiment uses a pair of complimentary codes (C2) as codes for modulation. FIGS. 7A and 7B illustrate examples of the pair of complimentary codes. A code A illustrated in FIG. 7A and a code B illustrated in FIG. 7B are the complimentary codes. In the examples illustrated in FIGS. 7A and 7B, code lengths N of the codes A and B are respectively 16 (N=16). Assuming that a delay time or a delay index between the codes A and B is k, an autocorrelation function of the code A is $R_A(k)$, and an autocorrelation function of the code B is $R_B(k)$, the pair of complimentary codes A and B codes have a property represented by the following expression (8).

$$R_A(k) + R_B(k) = \begin{cases} 2N: & k = 0 \\ 0: & \text{else} \end{cases} \quad (8)$$

Accordingly, when an autocorrelation between a component corresponding to each of the complimentary codes of the reception signal and each of the codes, and calculated autocorrelations are added, a side lobe of the merged autocorrelations theoretically results in 0.

Figure 8:
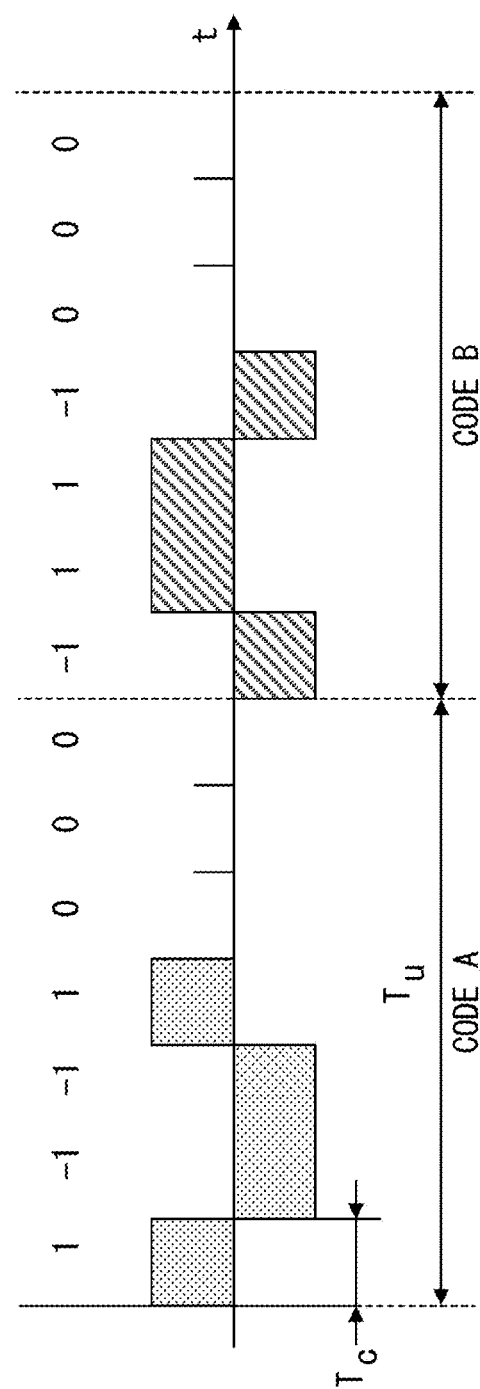
FIG. 8 illustrates an example of a timing chart of codes for modulation.

The radar of the DSSS method generates a modulation signal by using the pair of complimentary codes, which has the above described property, for modulation while switching the pair of complimentary codes for each frame length $T_u$ at specified timing. FIG. 8 illustrates an example of a timing chart of the codes for modulation. The codes A and B illustrated in FIG. 8 are the pair of complimentary codes, and each of the codes A and B configures a code sequence as illustrated in FIG. 8. $T_C$ is duration of a rectangular pulse on which a code is superposed. $T_u$ is a frame length, and represents a time width of a time slot occupied by each of the codes. When a carrier component is omitted to clarify the explanation, a probe signal $V_{TX}$ transmitted from the radar of the DSSS method is represented by the following expression (9).

$$v_{TX}(t) = \quad (9)$$

$$\sum_{m=0}^{\frac{M}{2}-1} \sum_{n=0}^{N-1} a_n p(t-nT_c)u(t-2mT_u) + b_n p(t-nT_c)u(t-(2m+1)T_u)$$

In the expression (9), p(t) is a rectangular pulse in the duration $T_C$, and u(t) is a rectangular pulse in the duration $T_u$. $a_n$ and $b_n$ are codes that respectively configure the complimentary codes A and B. m is a slot number. Assuming that code lengths of the complimentary codes A and B are N and a natural number larger than N is L (also L is hereinafter referred to as a frame length unless otherwise confused in the explanation), $T_u = LT_c$ is set, and 0 is padded in time of no signals $(L-N)T_0$ as illustrated in the example of FIG. 8. In the following explanation, the DSSS method that uses the above described pair of complimentary codes as codes for modulation/demodulation is sometimes referred to simply as complimentary code modulation (or demodulation).

Assume that the different detection and ranging apparatus which causes the interference signal transmits a probe signal represented by the expression (9). However, in the following explanation, the pair of complimentary codes that the different detection and ranging apparatus uses for modulation are represented by C and D for the sake of convenience, and codes that respectively configure a pair of complimentary codes C and D are represented by $c_n$ and $d_n$. Accordingly, the different detection and ranging apparatus that causes an interference signal is assumed to transmit a probe signal represented by replacing $a_n$ and $b_n$ within the expression (9) with $c_n$ and $d_n$.

Assume that the probe signal transmitted from the different detection and ranging apparatus is reflected by the non-target $T^U$ of the detection and ranging apparatus 20 and received by the detection and ranging apparatus 20 as illustrated in FIG. 1. In this case, a mathematical model for the interference signal which is an undesired reception signal is derived as follows.

Initially, by organizing effects of time slots within a chip function p(t) represented by the expression (9), the interference component within the signal received by the reception antenna 207, namely, the interference signal $V_{RX}^U(t)$ which is the undesired signal is represented by the following expression (10).

$$v_{RX}^U(t) = \exp\left[j\omega_d^U\left(t-\frac{\tau^U}{2}\right)\right] \sum_{m=0}^{\frac{M}{2}-1} \sum_{n=0}^{N-1} [c_n p(t-\tau^U-nT_c-2mT_u) + \quad (10)$$

$$d_n p(t-\tau^U-nT_c-(2m+1)T_u)]$$

$c_n$ and $d_n$ within the expression (10) are codes that respectively configure the pair of complimentary codes C and D of the interference signal. $\tau^U$ is a delay time taken until the probe signal transmitted from the different detection and ranging apparatus is reflected by the non-target $T^U$ and received by the detection and ranging apparatus 20 ($T^U$ is hereinafter assumed to be present at a midpoint on a linear line that links between the detection and ranging apparatus 20 and the different detection and ranging apparatus in order to clarify the explanation). $\tau^U$ can be represented as $\tau^U = uT_c$ by using the delay index u of the complimentary code.

In demodulation performed by the detection and ranging apparatus 20 which is the radar of the FMCW method, a time slot number m of a complimentary code modulation signal (C2 signal) does not have a sense. Accordingly, a demodulation output by the detection and ranging apparatus 20 in an arbitrary m is obtained. For example, in a section represented by $2mT_u \le t < 3mT_u$, the demodulation output $v^u(t;m)$ is represented by the following expression (11).

$$v^U(t;m) = v_{TX}^{D,FM,*}(t)v_{RX}^{U,C2,even}(t;m) \quad (11)$$

$$= \exp[-jh(t)]\exp\left[j\omega_d^U\left(t-\frac{\tau^U}{2}\right)\right]$$

$$\sum_{n=0}^{N-1} c_n p(t-\tau^U-nT_c-2mT_u)$$

$$= \exp\left(-j\int_{-\infty}^{t} f^D(x)dx\right)\exp\left[j\omega_d^U\left(t-\frac{\tau^U}{2}\right)\right]$$

$$\sum_{n=0}^{N-1} c_n p[(t-(n+u+2mL)T_c)]$$

In the expression (11), $V_{TX}^{D,FM,*}$ is a complex conjugate of the signal $V_{TX}^{D,FM}$ (reference signal) transmitted from the first distributor 204 to the mixer 211 within the detection and ranging apparatus 20, and $V_{RX}^{U,C2,even}$ is an interference signal received by the detection and ranging apparatus 20 and is an interference signal of an even-numbered time slot.

In the demodulation performed by the detection and ranging apparatus 20 which is the radar of the FMCW method, a section where a reference signal is clipped (not reduced to 0) with a complimentary code modulation signal is a section of $p(\ )\ne 0$, namely, a section represented by $0 \le t-(n+u+2\text{ mL})T_c<T_c$. Accordingly, the expression (11) is further represented by the following expression (12).

$$v^U(-;m) = \exp\left(-j\int_{-\infty}^{(u+2mL)T_c} f^D(x)dx\right) \quad (12)$$

$$\sum_{n=0}^{N-1} c_n \exp\left[-j\int_{(n+u+2mL)T_c}^{(n+1+u+2mL)T_c} f^D(x)dx\right] \exp\left[j\omega_d^U\left(n+\frac{u}{2}+2mL\right)T_c\right]$$

In the expression (12), the terms derived from Frequency Modulation (FM), which are clipped respectively in an up-chirp section and a down-chirp section as illustrated in FIG. 5, are obtained as represented by the following expression (13) in such a way that a specific expression is substituted into $f^D(x)$ in each of the sections and integration is performed.

$$\exp\left[-j\int_{(n+u+2mL)T_c}^{(n+1+u+2mL)T_c} f^D(x)dx\right] = \quad (13)$$

$$\begin{cases} \exp\left[-j\frac{4\Delta\omega^D}{T_m^D}\left(\frac{u+2mL+}{1}-\frac{1}{2}+\frac{T_m^D}{4T_c}\right)T_c^2\right]\exp\left[-j\frac{4\Delta\omega^D}{T_f}nT_c^2\right]; & \text{up} \\ \exp\left[j\frac{4\Delta\omega^D}{T_m^D}\left(\frac{u+2mL+}{1}-\frac{1}{2}-\frac{T_m^D}{4T_c}\right)T_c^2\right]\exp\left[j\frac{4\Delta\omega^D}{T_f}nT_c^2\right]; & \text{down} \end{cases}$$

Additionally, a mathematical model for an interference signal on which the property of codes is reflected can be obtained with more ease by handling an interference signal based on an assumption that a minimum section of the pair of codes C and D is included regardless of a frequency modulation chirp section. Therefore, the expressions (11) to (13) corresponding to the code D are obtained. Then, terms that do not depend on n within the expression (12) obtained respectively for the codes are organized for each of time slots occupied by the codes C and D, and the organized result are defined as represented by an expression (14): $\alpha_{up}(u;m)$, and an expression (15): $\beta_{up}(u;m)$. Then, by combining the expressions (14) and (15), and the earlier derived expression (13) corresponding to the codes C and D, for example, a mathematical model of the interference signal in the up-chirp section of frequency modulation is obtained by the expression (16).

$$\alpha_{up}(u; m) = \exp\left(-j\left[\int_{-\infty}^{(u+2mL)T_c} f^D(x)dx + \frac{4\Delta\omega^D}{T_m^D}\left(u + 2mL + \frac{1}{2} + \frac{T_m^D}{4T_c}\right)T_c^2 - \left(\frac{u}{2} + 2mL\right)\omega_d^U T_c\right]\right) \quad (14)$$

$$\beta_{up}(u; m) = \exp\left(-j\left[\int_{-\infty}^{(u+(2m+1)L)T_c} f^D(x)dx + \frac{4\Delta\omega^D}{T_m^D}\left(u + (2m+1)L + \frac{1}{2} + \frac{T_m^D}{4T_c}\right)T_c^2 - \left(\frac{u}{2} + (2m+1)L\right)\omega_d^U T_c\right]\right) \quad (15)$$

$$v^U(t) = \sum_{m=0}^{\frac{M}{2}-1}\sum_{n=0}^{N-1}\left\{\alpha_{up}(u; m)c_n\exp\left[-j\left(\frac{4\Delta\omega^D T_c}{T_m^D} - \omega_d^U\right)nT_c\right]\delta[t - (u + n + 2mL)T_c] + \beta_{up}(u; m)d_n\exp\left[-j\left(\frac{4\Delta\omega^D T_c}{T_m^D} - \omega_d^U\right)nT_c\right]\delta[t - (u + n + (2m+1)L)T_c]\right\} \quad (16)$$

As a matter of course, a mathematical model of the interference signal in the down-chirp section of the frequency modulation can be derived with a method similar to that of the mathematical model of the interference signal in the up-chirp section of the frequency modulation.

A lower limit of an integral range of the function $f^D(x)$ within the expressions (14) and (15) can be suitably set according to an actual signal. Therefore, the lower limit is denoted as $-\infty$ for convenience of clarifying the explanation. Moreover, a delta ($\delta$) function in the expression (16) is introduced to explicitly indicate a position on a time axis of the signal.

As represented by the expression (16), it can be understood that the demodulation output of the interference signal by the detection and ranging apparatus 20 which is the FMCW radar takes the shape of a sinusoidal wave clipped with pulses.

Figure 9:
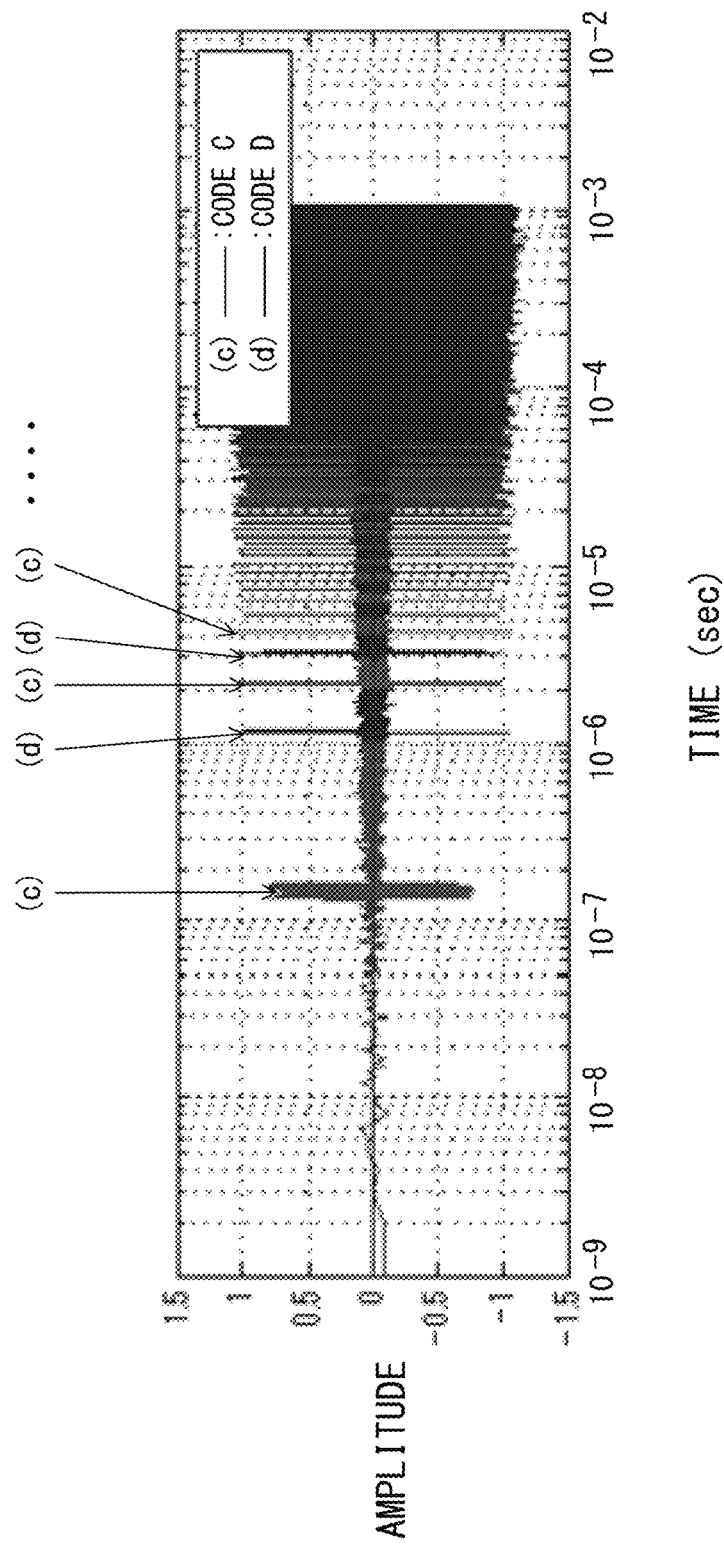
FIG. 9 illustrates an example of an interference signal for which FM demodulation is performed by the detection and ranging apparatus according to the first embodiment.
Figure 10:
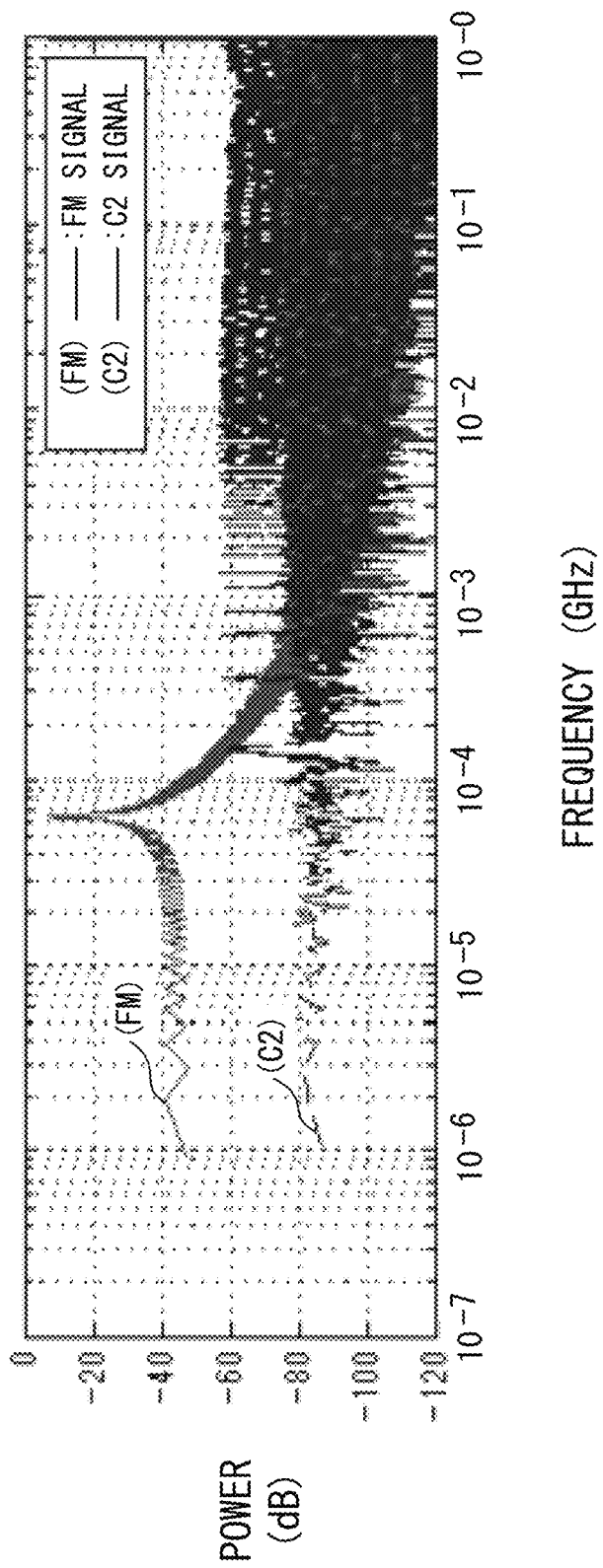
FIG. 10 illustrates an example of output results of an FFT process executed for a desired signal and an undesired signal, for which FM demodulation is performed by the detection and ranging apparatus according to the first embodiment.

FIG. 9 illustrates an example of an interference signal for which FM demodulation is performed by the detection and ranging apparatus according to the first embodiment. FIG. 10 illustrates an example of output results of an FFT process executed for a desired signal and an undesired signal, for which FM demodulation is performed by the detection and ranging apparatus according to the first embodiment. In the examples illustrated in FIGS. 9 and 10, parameters of the detection and ranging apparatus 20 which is the radar of the FMCW method are set as follows. Namely, a single-side maximum frequency shift $\Delta\omega^D$=250 MHz, a basic cycle $T_m^D$=1 msec, a carrier frequency shift $\Delta\omega_c$=0 MHz, and a difference of initial time $\Delta T$ between a modulation signal of a baseband oscillator and a modulation signal of an interference source is 0. Parameters of the different detection and ranging apparatus which is the radar of the DSSS method are set as follows. Namely, a pair of complimentary codes C and D a code length N of which is 16 (N=16), duration of a rectangular pulse on which a code is superposed $T_c^U$=2 nsec, a frame length (natural number larger than the code length N) $L^U$=1024, and the number of transmission frames $M^U$=1024. Moreover, specifications of the target $T^D$ and the non-target $T^U$ are set as follows. Namely, a distance $d^D$ to the target $T^D$=10 m, a distance $d^u$ to the non-target $T^U$=20 m, and a velocity $v^D$ of the target $T^D$=a velocity $v^U$ of the non-target $T^U$=0 km/h.

In FIG. 9, the interference signal output from the mixer 211 via the reception antenna 207, the low noise amplifier 208, and the second distributor 210 is represented with a time domain. In the first embodiment, the interference signal output from the mixer 211 is a signal obtained by performing FM demodulation for a complimentary code modulation signal (a signal modulated with complimentary codes, a C2 signal) transmitted from the different detection and ranging apparatus of the DSSS method. A vertical axis indicates an amplitude, whereas a horizontal axis indicates time (sec) displayed as semi-log. In FIG. 9, a line (c) corresponds to the complimentary code C, whereas a line (d) corresponds to the complimentary code D. As illustrated in FIG. 9, amplitudes of the lines (c) and (d) are alternately large at a point where the reference signal of the detection and ranging apparatus 20 is clipped with the codes C and D as suggested by the mathematical model represented by the expression (16).

FIG. 10 illustrates results obtained by executing an FFT process respectively for an FM signal which is a desired signal and a complimentary code modulation signal which is an undesired signal by the fast Fourier transform circuit 213 after FM demodulation is performed for the FM signal and the complimentary code modulation signal. The desired signal is a reflection signal generated in such a way that the probe signal transmitted from the detection and ranging apparatus 20 of the FMCW method is reflected by the target $T^D$. The undesired signal is an interference signal that is generated in such a way that the probe signal transmitted from the different detection and ranging apparatus of the DSSS method is reflected by the non-target $T^U$ and received by the detection and ranging apparatus 20. A vertical axis illustrated in FIG. 10 indicates power (dB), whereas a horizontal axis indicates a frequency (GHz) displayed as semi-log.

As a method for detecting and removing a complimentary code modulation signal which is an interference signal, a method for identifying specifications of the interference signal by subtracting an interfered signal component (desired signal component) recovered with the use of a probe signal from a reception signal for which FM demodulation is performed, and performing complimentary code demodulation for the subtracted reception signal may be cited. However, as represented by the expression (16), the interference signal for which FM demodulation is performed includes coefficients $\alpha_{up}(u;m)$ and $\beta_{up}(u;m)$ which include phase information and are difficult to be identified. Accordingly, a correlation peak that features an interference signal may disappear in the integration process of complimentary code demodulation for the interference signal for which FM demodulation is performed. Accordingly, with the method for subtracting the interfered signal component recovered by using the probe signal from the reception signal for which FM demodulation is performed and performing complimentary code demodulation for the subtracted reception signal, it may become difficult to identify the specifications of the interference signal.

Accordingly, as will be described below, the detection and ranging apparatus 20 detects and removes a complimentary code modulation signal which is an interference signal by using the expression (16) and features of the complimentary code modulation signal for which FM demodulation is performed as illustrated in FIGS. 9 and 10.

The reception antenna 207 receives a signal that may include an undesired interference signal in addition to a desired reflection signal (corresponding to step S103 of FIG. 3). The signal received by the reception antenna 207 passes through the low noise amplifier 208, the subtractor 209, and the second distributor 210, and is mixed with a probe signal input via the first distributor 204 by the mixer 211. Then, the signal (beat signal) mixed by the mixer 211 is input to the detector 216 via the variable low pass filter 212, the fast Fourier transform circuit 213, and the third distributor 214. Examples of the reception signal input to the detector 216 include the desired signal and the undesired signal, which are illustrated in FIG. 10. As described above, FIG. 10 illustrates results obtained by executing the FFT process respectively for the desired reflection signal and the undesired interference signal by the fast Fourier transform circuit 213. However, in an actual configuration of the detection and ranging apparatus 20, the fast Fourier transform circuit 213 executes the FFT process for a reception signal where an undesired interference signal is superposed on a desired reflection signal, and the signal for which the FFT process has been executed may be input to the detector 216.

The detector 216 detects the interference signal according to the input reception signal (corresponding to step S104). Specifically, the detector 216 makes a comparison between a set threshold value and a level of a noise floor, and determines that presence of the interference signal has been detected when the level of the noise floor exceeds the threshold value. The threshold value can be set based on specifications of the desired signal, namely, a level of the reception signal received in a state where the interference signal is not present, or based on a level of a noise floor when a reception signal is present or absent. For example, a spectrum of the interference signal illustrated in FIG. 10 is a cyclic spike noise larger by 20 dB than the noise floor in the state where the interference signal is absent. Accordingly, the detector 216 can detect the presence of the interference signal that cyclically exceeds the value by setting, as a threshold value, the level of the noise floor in the state where the interference signal is absent. Moreover, the detector 216 can detect that the interference signal is a pulsed signal by detecting a spike noise.

When the interference signal is detected by the detector 216 (corresponding to "YES" in step S104), the detection and ranging apparatus 20 identifies specifications of the interference signal by using a signal received while the transmission of the probe signal is being stopped (corresponding to step S106). The specifications of the interference signal in the first embodiment include a carrier frequency $\omega_c^U$ of the interference signal, and a pair of complimentary codes C and D that configure the interference signal. In particular, initially, the CPU 201 turns off an output of the high power amplifier 205 after driving the output of the radio frequency oscillator 203 in a Frequency Shift Keying (FSK) mode, and causes the transmission of the probe signal from the transmission antenna 206 to be stopped (corresponding to step S105). The output from the radio frequency oscillator 203 is input to the mixer 211 via the first distributor 204, and used for demodulation of the interference signal.

The reception antenna 207 receives a signal that can possibly include the interference signal while the transmission of the probe signal is being stopped. The signal received by the reception antenna 207 passes through via the low noise amplifier 208, the subtractor 209, and the second distributor 210, and is mixed with the signal for demodulation of the interference signal by the mixer 211. At this time, the subtractor 209 functions as a through line that outputs the input signal without any change. The signal mixed by the mixer 211 is input to the CPU 201 via the variable low pass filter 212, the fast Fourier transform circuit 213, the third distributor 214, and the detector 216.

A position on the frequency axis of the pulse noise that represents the interference signal as illustrated in FIG. 10 is decided by a difference between the output frequency from the radio frequency oscillator 203 and the carrier frequency of the interference signal. For example, when both of the frequencies match, a pulse noise is caused in the neighborhood of a direct current component of the signal output from the fast Fourier transform circuit 213. Accordingly, the CPU 201 identifies the carrier frequency $\omega_c^U$ of the interference signal by using, as an index, a correspondence between the position on the frequency axis of the pulse noise of the reception signal input to the detector 216 via the mixer 211 and the fast Fourier transform circuit 213, and the frequency of the output signal from the radio frequency oscillator 203 when the reception signal is input.

Next, in order to identify the complimentary code that configures the interference signal, the CPU 201 identifies a time slot width occupied by a complimentary code, namely, Pulse Repetition Interval (PRI). As is evident from the expression (16), it can be said that a signed section of the interference signal appears for each $LT_c$. Accordingly, it can be said that an inverse number of a peak interval of a pulse noise spectrum for which FM demodulation is performed via the mixer 211 and the fast Fourier transform circuit 213 is proportional to the PRI of the complimentary code. Therefore, the CPU 201 identifies the PRI of the complimentary code that configures the interference signal by calculating the inverse number of the peak interval of the pulse noise spectrum of the interference signal as illustrated in FIG. 10.

Additionally, $1/(2T_c)$ of an occupied frequency band of one noise peak within the interference signal as illustrated in FIG. 10 is equivalent to a code length of the complimentary code. Accordingly, the CPU 201 calculates the value of $1/(2T_c)$ after assuming a certain $T_c$, estimates the code length of the complimentary code used for the interference signal, and causes the code generator 217 to generate a pair of complimentary codes C and D having the corresponding code length. Then, the CPU 201 causes a signal for demodulation to be generated within the modulator/demodulator 218 by using the pair of complimentary codes C and D, which is generated by the code generator 217, and the set $T_c$, and causes the modulator/demodulator 218 to perform complimentary code demodulation for the reception signal input via the reception antenna 207, the low noise amplifier 208, and the second distributor 210.

Namely, the modulator/demodulator 218 down-converts the reception signal input via the reception antenna 207, the low noise amplifier 208, and the second distributor 210 with the carrier frequency of the interference signal, which is identified by the CPU 201. Moreover, the modulator/demodulator 218 extracts the down-converted reception signal for each PRI identified by the CPU 201. Then, the modulator/demodulator 218 calculates an autocorrelation between the signal for demodulation, which corresponds to one of the complimentary codes C and is generated by the modulator/demodulator 218, and an even-numbered reception signal extracted for each PRI, calculates a correlation value between the signal for demodulation, which corresponds to the other complimentary code D and is generated by the modulator/demodulator 218, and an odd-numbered reception signal extracted for each PRI, and adds the respective calculation results (actually, a coherent integration is further performed for the result of addition). The modulator/demodulator 218 outputs the added calculation result to the CPU 201 as a result of complimentary code demodulation.

The CPU 201 determines whether or not a correlation peak is detected from the result of the complimentary code demodulation performed by the modulator/demodulator 218. A state where the correlation peak is detected from the result of the complimentary code demodulation performed by the modulator/demodulator 218 means that the relationship represented by the expression (8) is satisfied between the pair of complimentary codes included in the reception signal while the transmission of the probe signal is being stopped and the pair of complimentary codes C and D generated by the code generator 217 (namely, a pair of codes of the interference signal is successfully estimated). Since a code length is decided corresponding to $T_c$ uniquely, the above described process is executed until the correlation peak is detected while a pair of codes having a corresponding code length is being changed as needed.

When the correlation peak is not detected for all signals for demodulation, which are generated by using a pair of codes corresponding to one $T_c$, the CPU 201 changes $T_c$, causes the code generator 217 to generate the pair of complimentary codes C and D, and causes the modulator/demodulator 218 to again perform complimentary code demodulation for the reception signal extracted for each PRI with procedures similar to the above described ones. Then, the CPU 201 repeats the above described process until the correlation peak is detected from a result of demodulation performed by the modulator/demodulator 218. Alternatively, when the correlation peak is detected from the result of demodulation performed by the modulator/demodulator 218, the CPU 201 identifies the pair of complimentary codes C and D that configure the interference signal by identifying the pair of complimentary codes from which the correlation peak is detected.

The fact that the pair of complimentary codes C and D can be successfully identified means that also $T_c$ can be properly identified. Therefore, an explanation about $T_c$ is omitted unless otherwise needed in the following explanation.

As described above, when specifications of an interference signal are identified, the CPU 201 turns on the output of the high power amplifier 205 after driving the output of the radio frequency oscillator 203 in the original FMCW mode, and causes the transmission of the probe signal from the transmission antenna 206 to be restarted (corresponding to step S107). After the transmission of the probe signal is restarted, the reception antenna 207 receives a signal including an interference signal along with a reflection signal which is a desired signal. The signal received by the reception antenna 207 is input to the mixer 211 via the low noise amplifier 208, the subtractor 209, and the second distributor 210. At this time, the subtractor 209 functions as a through line that outputs the input signal without any change.

The mixer 211 mixes the reception signal input via the second distributor 210 and the probe signal input via the first distributor 204. The reception signal mixed by the mixer 211 is input to the modulator/demodulator 218 via the variable low pass filter 212, the fast Fourier transform circuit 213, the third distributor 214, the detector 216, and the CPU 201.

The modulator/demodulator 218 down-converts the input reception signal with the identified carrier frequency of the interference signal, extracts the down-converted reception signal for each identified PRI, and calculates a correlation between the reception signal extracted for each PRI and the signal for demodulation generated by using the identified pair of complimentary codes C and D. In consequence, a result of the demodulation performed by the modulator/demodulator 218 is a signal where the result of complimentary code demodulation performed for a desired FM signal with the same pair of complimentary codes C and D as that of the interference signal is superposed on a result of complimentary code demodulation performed for the interference signal represented by the expression (10). Namely, a result of coherent integration of a correlation computation sum obtained from the modulator/demodulator 218 includes the delay amount $\tau^U$ which is a feature amount of an interference signal. Accordingly, the CPU 201 identifies the delay amount $\tau^U$ of the interference signal based on a peak position of the result of this correlation computation (corresponding to step S108).

Figure 11A:
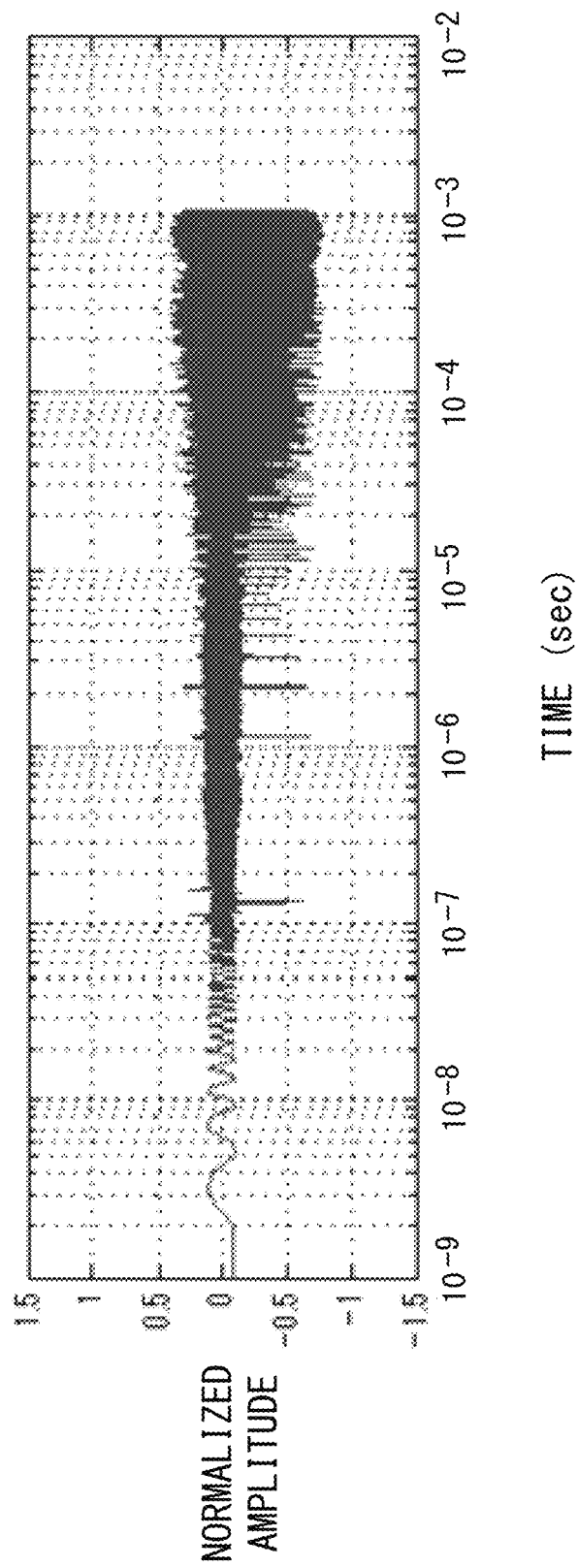
FIG. 11A illustrates an example of results of a correlation computation performed by a modulator/demodulator in the first embodiment.

FIGS. 11A and 11B illustrate an example of the result of the correlation computation performed by the modulator/demodulator in the first embodiment. FIGS. 11A and 11B illustrate, according to an elapsed time from a start time of demodulation, a real part of the result of the correlation computation performed between the reception signal extracted for each PRI and the signal for demodulation generated by using the identified complimentary code. In addition, FIG. 12A illustrates an example of a result obtained by performing coherent integration for a sum of correlation values related to the respective codes illustrated in FIG. 11A, whereas FIG. 12B illustrates an example of the result of performing coherent integration for a sum of correlation values related to the respective codes illustrated in FIG. 11B.

Figure 12A:
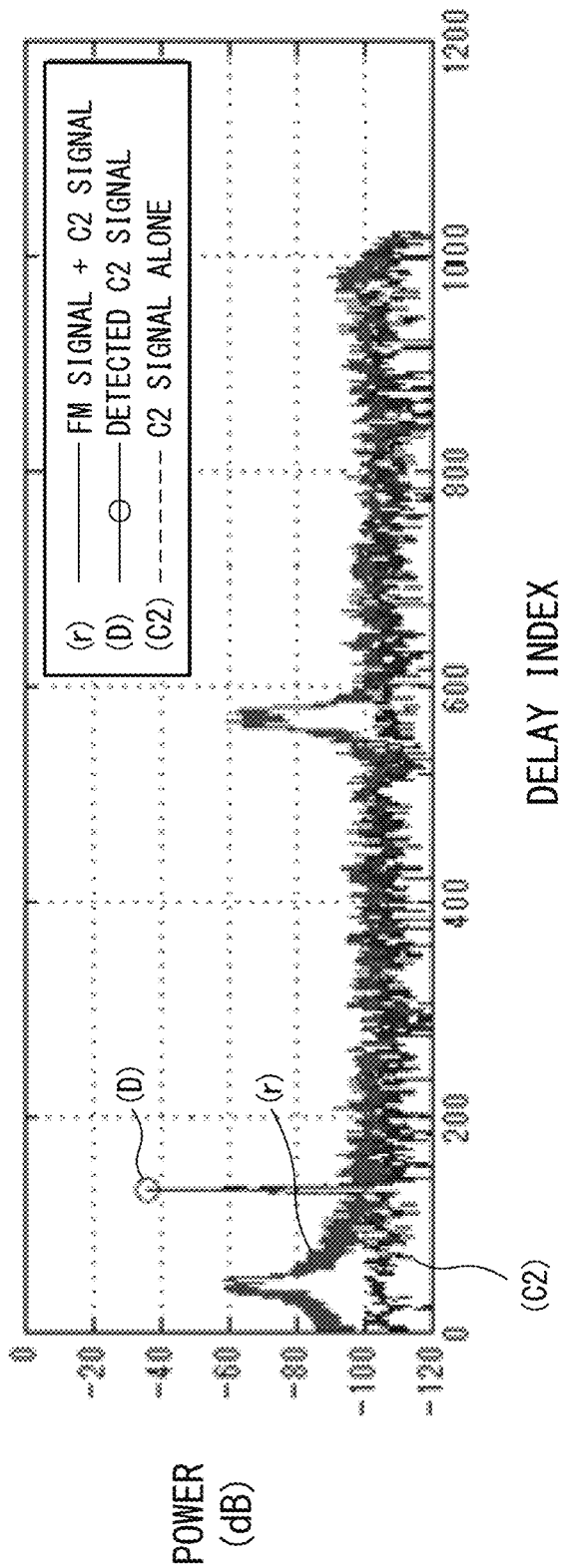
FIG. 12A illustrates an example of a correlation sum of the results of the correlation computation illustrated in FIG. 11A.
Figure 12B:
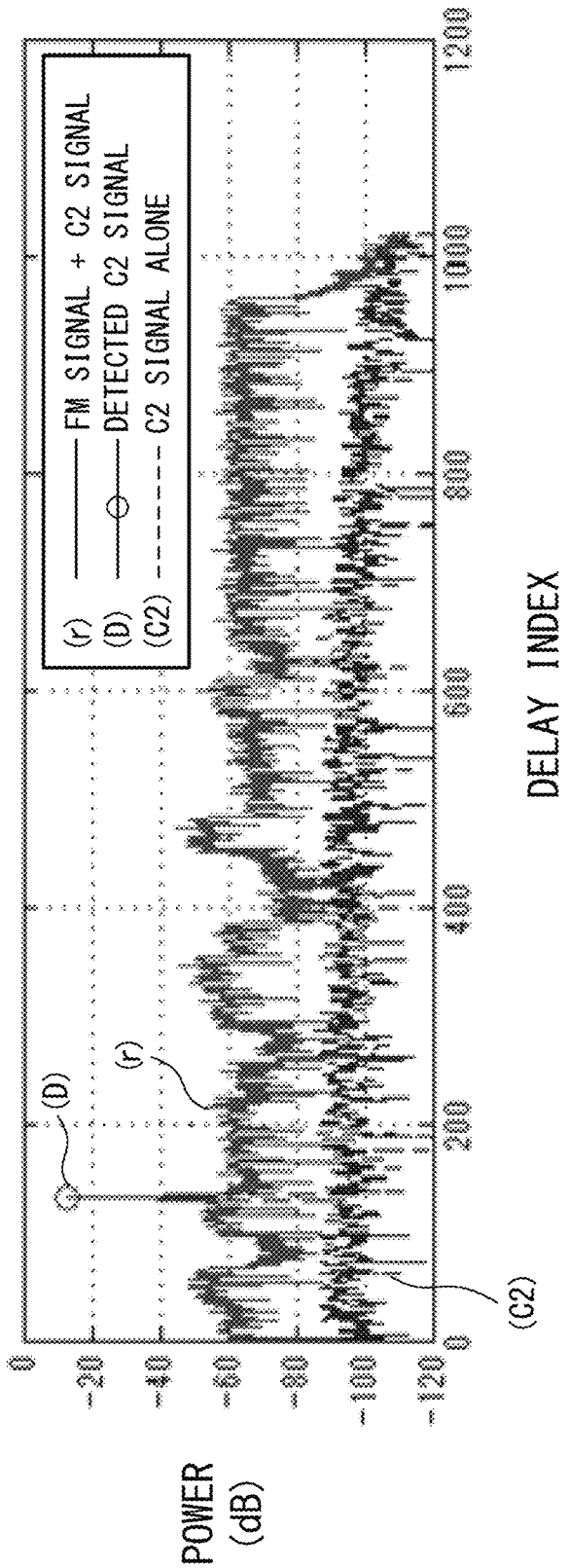
FIG. 12B illustrates an example of a correlation sum of the results of the correlation computation illustrated in FIG. 11B.

In FIGS. 11A and 12A, specifications of the detection and ranging apparatus 20 are as follows. Namely, a single-side maximum frequency shift $\Delta\omega^D$=250 MHz, a basic cycle $Tm^D$=1 msec, a carrier frequency shift $\Delta\omega_c$=0 MHz, and a difference of initial time $\Delta T$ between a modulation signal of the baseband oscillator and a modulation signal of an interference source is 0. Moreover, specifications of a different detection and ranging apparatus that causes an interference signal are as follows. Namely, a pair of complimentary codes C and D a code length N of which is 16 (N=16), duration of a rectangular pulse on which a code is superposed $T_c^U$=2 nsec, a frame length $L^U$=1024, and the number of transmission frames $M^U$=1024. In FIGS. 11B and 12B, specifications of the detection and ranging apparatus 20 are as follows. Namely, a single-side maximum frequency shift $\Delta\omega^D$=250 MHz, a basic cycle $Tm^D$=0.125 msec, a carrier frequency shift $\Delta\omega_c$=0 MHz, and a difference of initial time $\Delta T$ between a modulation signal of the baseband oscillator and a modulation signal of the interference source is 0. Moreover, specifications of the different detection and ranging apparatus that causes the interference signal are as follows. Namely, a pair of complimentary codes C and D a code length N of which is 256 (N=256), duration of a rectangular pulse on which a code is superposed $T_c^U$=2 nsec, a frame length $L^U$=1024, and the number of transmission frames $M^U=1024$. Specifications of the target $T^D$ and the non-target $T^U$ are set as follows similarly to FIGS. 9 and 10. Namely, a distance $d^D$ to the target $T^D=10$ m, a distance $d^u$ to the non-target $T^U=20$ m, and a velocity $v^D$ of the target $T^D=$a velocity $v^U$ of the non-target $T^U=0$ km/h.

The reception signal is configured with a sum of the reflection signal (FM signal) response to the probe signal which is a desired signal of the detection and ranging apparatus 20, and the interference signal (the complimentary code modulation signal, the C2 signal) which is an undesired signal caused by the different detection and ranging apparatus. The modulator/demodulator 218 down-converts the reception signal having such a configuration with an identified carrier frequency of the interference signal, extracts the down-converted reception signal for each identified PRI, generates signals for demodulation by using a pair of identified complimentary codes C and D, and performs a correlation computation with these signals. In this case, a result of the correlation computation is a signal where a result of the correlation computation performed between the desired FM signal and the pair of complimentary codes is superposed on a result of demodulation of the complimentary code modulation signal represented by the expression (10) as illustrated in FIGS. 11A and 11B.

When a power level of the interference signal is high and coherency is not lost while the integration process is executed in the course of the demodulation performed with the above described pair of complimentary codes, the CPU 201 can calculate a delay amount (delay index) corresponding to a position of a transmission source of the interference signal based on not only the specifications of the interference signal but the value of the correlation delay index corresponding to the peak position that appears in a result obtained by performing coherent integration for the sum of correlation values of each of the codes.

As described above, when the specifications of the interference signal and the delay amount $\tau^U$ of the interference signal are identified, the CPU 201 generates a copy of the interference signal modulated with the DSSS method by using the identified specifications and delay amount $\tau^U$ of the interference signal. Namely, the code generator 217 generates the pair of identified complimentary codes C and D according to an instruction from the CPU 201. The modulator/demodulator 218 generates the signal modulated with the DSSS method by generating a complimentary code modulation signal with the use of the codes generated by the code generator 217, and up-converting the signal with the carrier frequency $\omega_c^U$. Then, the modulator/demodulator 218 generates the copy of the interference signal by giving the identified delay amount $\tau^U$ to the generated signal, and inputs the copy to the subtractor 209.

To the subtractor 209, the copy of the interference signal, which is generated by the modulator/demodulator 218, and the reception signal received by the reception antenna 207 are input. The subtractor 209 removes an interference signal component from the reception signal by subtracting the input copy of the interference signal from the input reception signal (corresponding to step S109).

The reception signal from which the interference signal is removed by the subtractor 209 is input to the mixer 211 via the second distributor 210. The mixer 211 generates a beat signal by mixing the probe signal for demodulation, which is distributed by the first distributor 204, and the reception signal distributed by the second distributor 210. The fast Fourier transform circuit 213 calculates a frequency spectrum of the beat signal. The signal processing circuit 215 calculates feature amounts of the target $T^D$, such as a distance to the target $T^D$ and a velocity of the target $T^D$, by using the frequency spectrum of the beat signal, which is calculated by the fast Fourier transform circuit 213.

As described above, with the detection and ranging apparatus 20 according to the first embodiment, an interference signal can be detected from a reception signal, and the detected interference signal can be removed from the reception signal.

The above described interference signal removing process executed by the detection and ranging apparatus 20 is merely an example for explaining the embodiment, and various changes can be made.

For example, in the above provided explanation, an interference signal component is removed from a reception signal by subtracting a copy of an interference signal from the reception signal by the subtractor 209. However, as described above (see FIG. 10), the detector 216 can detect the interference signal that appears as a pulsed noise from the reception signal for which FM demodulation is performed. Moreover, as described above, the inverse number of the peak interval of the pulse noise spectrum for which FM demodulation is performed is proportional to PRI of a complimentary code. Accordingly, the CPU 201 may be configured to identify PRI of an interference signal based on the interference signal detected by the detector 216 when the interference signal is detected by the detector 216. Moreover, the CPU 201 may be configured to adjust a passband of the variable low pass filter 212 based on the identified PRI. Additionally, the CPU 201 may be configured to adjust a sampling phase or a sampling cycle, which is input to the mixer 211, when a section of no signals within the identified PRI is long. Also with such a configuration, an interference signal can be removed from a reception signal.

Second Embodiment

In the second embodiment, the first modulation method is the DSSS method, whereas the second modulation method is the FMCW method. Namely, a detection and ranging apparatus according to the second embodiment is a radar of the DSSS method, and a different detection and ranging apparatus that exerts an interference signal to the detection and ranging apparatus according to the second embodiment is a radar of the FMCW method. Moreover, in the example illustrated in FIG. 1, the detection and ranging apparatus according to the second embodiment is equivalent to the radar 1, whereas the different detection and ranging apparatus that exerts the interference signal to the detection and ranging apparatus according to the second embodiment is equivalent to the radar 2. FIG. 1 illustrates one target $T^D$ of the radar 1, and one radar 2 that causes an interference signal as examples. However, the detection and ranging apparatus according to the second embodiment can detect a plurality of targets $T^D$, and can measure feature amounts of the plurality of detected targets $T^D$. Moreover, the detection and ranging apparatus according to the second embodiment can detect a plurality of interference signals, and can remove the plurality of detected interference signals from a reception signal.

Figure 13:
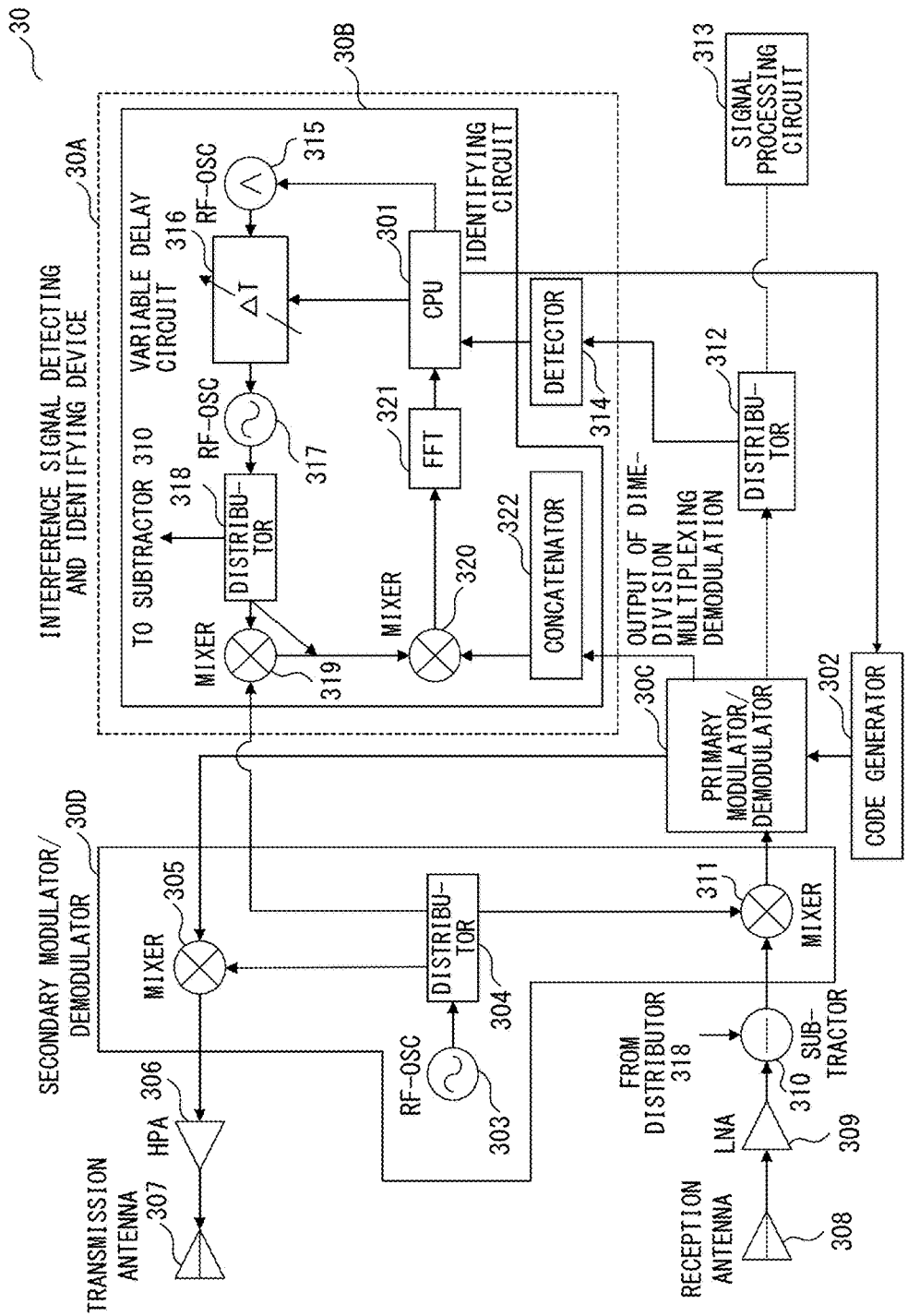
FIG. 13 schematically illustrates a hardware configuration of a detection and ranging apparatus according to a second embodiment.

FIG. 13 schematically illustrates a hardware configuration of the detection and ranging apparatus according to the second embodiment. FIG. 14 schematically illustrates a portion that includes a hardware configuration example of a primary modulator/demodulator and is implemented by removing an interference detecting and avoiding mechanism from the detection and ranging apparatus according to the second embodiment.

As illustrated in FIG. 13, the detection and ranging apparatus 30 according to the second embodiment includes a CPU 301, a code generator 302, a primary modulator/demodulator 30C, a first radio frequency oscillator (RF-OSC) 303, a first distributor 304, a first mixer 305, a high power amplifier (HPA) 306, and a transmission antenna 307. The detection and ranging apparatus 30 also includes a reception antenna 308, a low noise amplifier (LNA) 309, a subtractor 310, a second mixer 311, a second distributor 312, and a signal processing circuit 313. The detection and ranging apparatus 30 further includes a detector 314, a baseband oscillator (BB-OSC) 315, a variable delay circuit 316, a second radio frequency oscillator 317, a third distributor 318, a third mixer 319, a fourth mixer 320, a fast Fourier transform (FFT) circuit 321, and a concatenator 322. The transmission antenna 307 and the reception antenna 308 may be configured integrally as a transmission/reception antenna.

The CPU 301, the baseband oscillator 315, the variable delay circuit 316, the second radio frequency oscillator 317, the third distributor 318, the third mixer 319, the fourth mixer 320, the fast Fourier transform (FFT) circuit 321, and the concatenator 322 among the above described components are included in an interference signal identifying device 30B. Moreover, the interference signal identifying device 30B and the detector 314 are included in an interference signal detecting and identifying device 30A. The first radio frequency oscillator (RF-OSC) 303, the first distributor 304, the first mixer 305, and the second mixer 311 are included in a secondary modulator/demodulator 30D.

Additionally, as illustrated in FIG. 14, the primary modulator/demodulator 30C includes a data generator 401, a first switch 402A, a second switch 402B, a fifth mixer 403A, a sixth mixer 403B, and a multiplexer 404. The primary modulator/demodulator 30C also includes a fourth distributor 405, a third switch 406A, a fourth switch 406B, a first correlator 407A, a second correlator 407B, and an adder 408.

The CPU 301 may correspond to the controlling unit 110. The code generator 302, the primary modulator/demodulator 30C, and the secondary modulator/demodulator 30D may correspond to the probe signal generating unit 120. The high power amplifier 306 and the transmission antenna 307 may correspond to the transmitting unit 130. The reception antenna 308 and the low noise amplifier 309 may correspond to the receiving unit 140. The secondary modulator/demodulator 30D, the code generator 302, and the primary modulator/demodulator 30C may correspond to the demodulating unit 150. The detector 314 may correspond to the interference signal detecting unit 160. The primary modulator/demodulator 30C, the concatenator 322, the CPU 301, the baseband oscillator 315, the variable delay circuit 316, the second radio frequency oscillator 317, the first radio frequency oscillator 303, the first distributor 304, the third mixer 319, the fourth mixer 320, the fast Fourier transform (FFT) circuit 321, and the concatenator 322 may correspond to the interference signal identifying unit 170. The CPU 301, the baseband oscillator 315, the variable delay circuit 316, the second radio frequency oscillator 317, the third distributor 318, and the subtractor 310 may correspond to the interference signal removing unit 180. The signal processing circuit 313 may correspond to the signal processing unit 190.

As described above, the detection and ranging apparatus 30 is the radar of the DSSS method. Operations of the detection and ranging apparatus 30 in a state where an interference signal is not received are initially described.

In the detection and ranging apparatus 30, a data signal generated within the primary modulator/demodulator 30C is modulated by using a pair of complimentary codes generated by the code generator 302 according to an instruction from the CPU 301, and this signal is further modulated by the secondary modulator/demodulator 30D. A probe signal $V_{TX}^D(t)$ is thereby generated.

The pair of complimentary codes generated by the code generator 302 is, for example, the codes A and B described above with reference to FIGS. 7A and 7B. The pair of complimentary codes A and B has the property represented by the above provided expression (8). As illustrated in FIG. 14, a data signal generated by the data generator 401 is input to the mixer 403A or 403B according to ON/OFF of the first switch 402A and the second switch 402B which are exclusively switched for each time slot $T_u$. Then, the data signal input to the fifth mixer 403A or the sixth mixer 403B is mixed with the code A or B output from the code generator 302 in synchronization with ON/OFF of the first switch 402A and the second switch 402B. The signal mixed by the fifth mixer 403A and the sixth mixer 403B is time-multiplexed by the multiplexer 404. The signal time-multiplexed by the multiplexer 404 is input to the first mixer 305, mixed with a carrier signal output from the first radio frequency oscillator 303, and up-converted into a carrier frequency. As a result, a probe signal $V_{TX}^D(t)$ is generated. The generated $V_{TX}^D(t)$ is a signal represented by the expression (9). As described above, however, a carrier component is omitted in the expression (9). The generated probe signal $V_{TX}^D(t)$ is amplified by the high power amplifier 306, and transmitted from the transmission antenna 307 to the outside of the detection and ranging apparatus 30.

The reception antenna 308 receives a reflection signal generated in such a way that the probe signal transmitted from the transmission antenna 307 is reflected by the target $T^D$. The reflection signal received by the reception antenna 308 is amplified by the low noise amplifier 309, and input to the second mixer 311 via the subtractor 310. In a case where the interference signal removing process according to the embodiment is not executed, the subtraction process by the subtractor 310 is not executed.

The reception signal input to the second mixer 311 is mixed with the carrier signal output from the first radio frequency oscillator 303, and down-converted into a baseband. The baseband reception signal is input to the primary modulator/demodulator 30C.

As illustrated in FIG. 14, the reception signal input to the primary modulator/demodulator 30C is distributed by the fourth distributor 405, and the distributed reception signal is input to the first correlator 407A or the second correlator 407B according to ON/OFF of the third switch 406A and the fourth switch 406B which are exclusively switched for each time slot $T_u$. A signal represented by the following expression (17) or (18) is input to the first correlator 407A or the second correlator 407B depending on whether a time slot number for which the third switch 406A or the fourth switch 406B is turned on is either an even number or an odd number. To simplify the explanation, an origin point of time is assumed to be retaken for each extracted time slot.

$$v_{RX}^{D,even}(t) = \sum_{n=0}^{N-1} a_n p(t - \tau^D - nT_c)\exp\left[j\omega_d^D\left(t - \frac{\tau^D}{2}\right)\right] \quad (17)$$

$$v_{RX}^{D,odd}(t) = \sum_{n=0}^{N-1} b_n p(t - \tau^D - nT_c) \exp\left[j\omega_d^D\left(t - \frac{\tau^D}{2}\right)\right] \quad (18)$$

The first correlator 407A calculates a correlation between the input reception signal, namely, a signal of an even-numbered time slot, and a signal obtained by mixing the data signal that is input to the mixer 403A and transmitted from the data generator 401 and the code A from the code generator 302. The second correlator 407B calculates a correlation between the input reception signal, namely, a signal of an odd-numbered time slot, and a signal obtained by mixing the data signal that is input to the mixer 403B and transmitted from the data generator 401 and the code B from the code generator 302. An output $V_{BB}^{D,even}$ of the first correlator 407A and an output $V_{BB}^{D,odd}$ of the second correlator 407B are respectively represented by the following expressions (19) and (20).

$$v_{BB}^{D,even}(\gamma) = \frac{1}{T_u}\int_0^{T_u} v_{TX}^{D,even,*}(t) v_{RX}^{D,even}(t+\gamma)dx = \quad (19)$$

$$\frac{1}{LT_c}\sum_{n,m=0}^{N-1} a_n a_m \int_{nT_c}^{(n+1)T_c} p(t-nT_c)$$

$$p(t+\gamma-\tau^D-mT_c)\exp\left[j\omega_d^D\left(t+\gamma-\frac{\tau^D}{2}\right)\right]dt$$

$$v_{BB}^{D,odd}(\gamma) = \frac{1}{T_u}\int_0^{T_u} v_{TX}^{D,odd,*}(t) v_{RX}^{D,odd}(t+\gamma)dx = \quad (20)$$

$$\frac{1}{LT_c}\sum_{n,m=0}^{N-1} b_n b_m \int_{nT_c}^{(n+1)T_c} p(t-nT_c)$$

$$p(t+\gamma-\tau^D-mT_c)\exp\left[j\omega_d^D\left(t+\gamma-\frac{\tau^D}{2}\right)\right]dt$$

An integrated function must not be zero in any cases in $[nT_c, (n+1)T_c]$ so that the correlation outputs represented by the expressions (19) and (20) reach a peak in time represented by $\gamma=\tau^D=kT_c$ when an identification number of the target $T^D$ is assumed to be k. Namely, the peak output $v_{BB}^{D,even}$ of the first correlator 407A and the peak output $v_{BB}^{D,odd}$ of the second correlator 407B are respectively represented by the following expressions (21) and (22).

$$v_{BB}^{D,even}(kT_c) = \quad (21)$$

$$\frac{1}{LT_c}\sum_{n,m=0}^{N-1} a_n a_m \int_{nT_c}^{(n+1)T_c} p(t-nT_c)p(t-mT_c)\exp\left[j\omega_d^D\left(t+\frac{kT_c}{2}\right)\right]dt =$$

$$\frac{1}{L}\sum_{n=0}^{N-1} a_n a_n \exp\left[j\omega_d^D T_c\left(n+\frac{k+1}{2}\right)\right]\mathrm{sinc}\left(\frac{\omega_d^D T_c}{2}\right)$$

$$v_{BB}^{D,odd}(kT_c) = \frac{1}{L}\sum_{n=0}^{N-1} b_n b_n \exp\left[j\omega_d^D T_c\left(n+\frac{k+1}{2}\right)\right]\mathrm{sinc}\left(\frac{\omega_d^D T_c}{2}\right) \quad (22)$$

Results of the correlation computations performed by the first correlator 407A and the second correlator 407B are added by the adder 408 (the explanation is provided by regarding one time slot as a unit in order to clarify the explanation although coherent integration is further performed for an addition result in an actual case), and output to the signal processing circuit 313 via the second distributor 312. Namely, a system output (demodulation output) from the adder 408 is represented by the following expression (23).

$$v_{BB}^{D,even}(\gamma) + v_{BB}^{D,odd}(\gamma) = \quad (23)$$

$$\begin{cases} \frac{2N}{L}\mathrm{sinc}\left(\frac{\omega_d^D NT_c}{2}\right)\exp\left[j\omega_d^D T_c\left(\frac{N+k}{2}\right)\right]; & \gamma = kT_c \\ 0; & \text{else} \end{cases}$$

The signal processing circuit 313 measures feature amounts of the target $T^D$ by using the signal output from the adder 408. For example, the signal processing circuit 313 calculates a distance to the target $T^D$ with the expression (1) based on a position on a time axis (a delay index, which is a horizontal axis of the correlation computation) of the correlation peak. For a velocity, a method for calculating the velocity by using a time differential of the distance is appropriate.

When the reception antenna 308 receives an interference signal from a different detection and ranging apparatus in a case where the detection and ranging apparatus 30 operates as the above described DSSS radar, the detection and ranging apparatus 30 removes an interference component from a reception signal by executing an interference signal removing process described below.

As described above, the different detection and ranging apparatus that causes an interference signal is the radar of the FMCW method in the second embodiment. The radar of the FMCW method as a premise in the second embodiment is assumed to be a radar that transmits the same probe signal as the detection and ranging apparatus 20 according to the first embodiment. Namely, the different detection and ranging apparatus is assumed to transmit the probe signal represented by the expression (6) where the superscript "D" that represents "Desired" is changed to the superscript "U" that represents "Undesired".

Assume that the probe signal, which is transmitted from the different detection and ranging apparatus and represented by the expression (6), is reflected by the non-target $T^U$ of the detection and ranging apparatus 30 and received by the detection and ranging apparatus 30 as illustrated in FIG. 1. In this case, a mathematical model for an interference signal which is the received undesired signal, is derived as follows.

Assume that the pair of complimentary codes used by the detection and ranging apparatus 30 is composed of codes A and B. The mathematical model for an interference component obtained by calculating a correlation between a reception signal of an even-numbered time slot and the complimentary code A, namely, the mathematical model for the interference component demodulated with the complimentary code A is derived below.

As described above with reference to FIG. 14, demodulation performed by the detection and ranging apparatus 30 which is the radar of the DSSS method is correlation detection. Therefore, the interference component demodulated with the complimentary code A is represented by the following expression (24).

$$v^U(\gamma) = \qquad (24)$$

$$\frac{1}{T_u}\int_0^{T_U} v_{TX}^{D,even,*}(t) v_{RX}^{U,FM}(t+\gamma) dt = \frac{1}{LT_c}\sum_{n=0}^{N-1} a_n \int_{nT_c}^{(n+1)T_c} p(t-nT_c)$$

$$\exp\left\{j\left[\int_{-\infty}^{t+\gamma-uT_c} f(x)dx + \omega_d^U\left(t+\gamma-\frac{uT_c}{2}\right)\right]\right\} dt$$

In the expression (24), $V_{TX}^{D,even,*}$ is a complex conjugate of the probe signal $V_{TX}^{D,even}$ of the even-numbered time slot, which is transmitted from the detection and ranging apparatus 30, and $V_{RX}^{U,FM}$ is the interference signal received by the detection and ranging apparatus 30. Moreover, $\tau^U$ is a delay time taken until the probe signal transmitted from the different detection and ranging apparatus is reflected by the non-target $T^U$ and received by the detection and ranging apparatus 30 (for simplification, $T^U$ is hereinafter assumed to be present at a midpoint on a linear line that links the detection and ranging apparatus 30 and the different detection and ranging apparatus), and can be represented as $T^U=uT_c$ using a delay index u.

To obtain a strict mathematical model of the interference signal, an integral range of a signal for frequency modulation (FM) f(t) within the expression (24) is initially divided as represented by the following expression (25).

$$\exp\{j[\int_{-\infty}^{t+\gamma-uT_c} f(x)dx]\} = \exp\{j[\int_{-\infty}^{\gamma-uT_c} f(x)dx + \int_{\gamma-uT_c}^{t+\gamma-uT_c} f(x)dx]\} \qquad (25)$$

Then, an exponential function part of the expression (24) can be represented as the expression (26) by using the expression (25).

$$\exp\left\{j\left[\int_{-\infty}^{t+\gamma-uT_c} f(x)dx + \omega_d^U\left(t+\gamma-\frac{uT_c}{2}\right)\right]\right\} = \qquad (26)$$

$$\exp\left\{j\left[\int_{-\infty}^{\gamma-uT_c} f(x)dx + \omega_d^U\left(\gamma-\frac{uT_c}{2}\right) + \int_{\gamma-uT_c}^{t+\gamma-uT_c} f(x)dx + \omega_d^U t\right]\right\}$$

Here, when the third term within square brackets [ ] in the expression (26) is calculated respectively for an up-chirp section and a down-chirp section of the frequency modulation, the third term is represented by the following expression (27).

$$\int_{\gamma-uT_c}^{t+\gamma-uT_c} f(x)dx = \qquad (27)$$

$$\begin{cases} \frac{2\Delta\omega^U}{T_m^U}x^2 + \Delta\omega x \Big|_{\gamma-uT_c}^{t+\gamma-uT_c} = \frac{2\Delta\omega^U}{T_m^U}\left[\frac{t^2+}{2(\gamma-uT_c)t}\right] + \Delta\omega^U t; \quad \text{up} \\ -\frac{2\Delta\omega^U}{T_m^U}x^2 + \Delta\omega x \Big|_{\gamma-uT_c}^{t+\gamma-uT_c} = -\frac{2\Delta\omega^U}{T_m^U}\left[\frac{t^2+}{2(\gamma-uT_c)t}\right] + \Delta\omega^U t; \quad \text{down} \end{cases}$$

Accordingly, when the third term and the fourth term within the square brackets [ ] in the expression (26), for example, in the up-chirp section are organized for an integral variable t, the third term and the fourth term are represented by the following expression (28).

$$\int_{\gamma-uT_c}^{t+\gamma-uT_c} f(x)dx + \omega_d^U t = \qquad (28)$$

$$\frac{2\Delta\omega^U}{T_m^U}t^2 + \frac{4\Delta\omega^U}{T_m^U}\left(\gamma - uT_c + \frac{T_m^U}{4} + \frac{\omega_d^U T_m^U}{4\Delta\omega^U}\right)t$$

Here, when β and χ are defined by the expression (29) and the expression (28) is square-completed, an expression (30) is obtained.

$$\frac{2\Delta\omega^U}{T_m^U} \equiv \beta, \quad -uT_c + \frac{T_m^U}{4} + \frac{\omega_d^U T_m^U}{4\Delta\omega^U} \equiv \chi \qquad (29)$$

$$\beta t^2 + 2\beta(\gamma+\chi)t = \beta[t^2 + 2(\gamma+\chi)t + (\gamma+\chi)^2] - \beta(\gamma+\chi)^2 = \qquad (30)$$
$$\beta[t + (\gamma+\chi)]^2 - \beta(\gamma+\chi)^2$$

Accordingly, by performing variable conversion: s=t−nT$_c$, integration for t in the expression (24) can be represented as the following expression (31).

$$\int_{nT_c}^{(n+1)T_c} p(t-nT_c)\exp\{j\beta[(t+(\gamma+\chi))^2 - (\gamma+\chi)^2]\}dt = \exp[-j\beta(\gamma+\chi)^2]\int_0^{T_c}\exp\{j\beta[s+(\gamma+\chi+nT_c)]^2\}ds \qquad (31)$$

By further performing a variable conversion represented by the expression (32) for the expression (24) in order to concretize the model, s takes a range indicated by the left of an arrow in the expression (33). Therefore, a range of t indicated by the right of the arrow in the expression (33) is obtained. By summarizing the explanation up to this point, a result $v_{up}^U(\gamma)$ obtained by performing complimentary code demodulation for the FM interference signal in the up-chirp section is represented as the following expression (34).

$$t = \sqrt{\beta}[s + (\gamma+\chi+nT_c)] \quad \ldots \quad dt = \sqrt{\beta}\, ds \qquad (32)$$

$$0 \leq s < T_c \to \sqrt{\beta}(\gamma+\chi+nT_c) \leq t < \sqrt{\beta}(\gamma+\chi+(n+1)T_c) \qquad (33)$$

$$v_{up}^U(\gamma) = \exp\left\{j\left[\int_{-\infty}^{\gamma-uT_c} f(x)dx + \omega_d^U\left(\gamma-\frac{uT_c}{2}\right) - \beta(\gamma+\chi)^2\right]\right\} \qquad (34)$$

$$\frac{1}{LT_c}\sum_{n=0}^{N-1} a_n \frac{1}{\sqrt{\beta}} \int_{\sqrt{\beta}(\gamma+\chi+nT_c)}^{\sqrt{\beta}(\gamma+\chi+(n+1)T_c)} \exp\{jt^2\}dt$$

Additionally, by calculating in procedures similar to those in the case of the up-chirp section after β and χ are defined as represented by the following expression (35) as a replacement for the expression (29), a result $v_{down}^U(\gamma)$ obtained by performing complimentary code demodulation for the FM interference signal in the down-chirp section is represented by the following expression (36).

$$\frac{2\Delta\omega^U}{T_m^U} \equiv \beta, \quad -uT_c - \frac{T_m^U}{4} - \frac{\omega_d^U T_m^U}{4\Delta\omega^U} \equiv \chi \qquad (35)$$

$$v_{down}^U(\gamma) = \exp\left\{j\left[\int_{-\infty}^{\gamma-uT_c} f(x)dx + \omega_d^U\left(\gamma-\frac{uT_c}{2}\right) + \beta(\gamma+\chi)^2\right]\right\} \qquad (36)$$

$$\frac{1}{LT_c}\sum_{n=0}^{N-1} a_n \frac{1}{\sqrt{\beta}} \int_{\sqrt{\beta}(\gamma+\chi+nT_c)}^{\sqrt{\beta}(\gamma+\chi+(n+1)T_c)} \exp\{-jt^2\}dt$$

As a matter of course, a model of an interference component included in a reception signal of an odd-numbered time slot can be similarly derived by performing a calculation similar to the above described one with the use of the complimentary code B.

A complete mathematical model is that obtained by adding results obtained by performing complimentary code demodulation for the interference signal received in each of even-numbered and odd-numbered slots with a code corresponding to each of the slots. As one example of the complete mathematical model, a process result of the interference signal in the down-chirp section $[0, 2LT_c]$ is represented by the following expression (37).

$$v_{down}^{U}(\gamma) = v_{down}^{U,even}(\gamma)u(\gamma) + v_{down}^{U,odd}(\gamma)(\gamma - T_u) = \qquad (37)$$

$$\exp\left\{j\left[\omega_d^U \frac{uT_c}{2} + \frac{\Delta\omega^U T_m^U}{8}\left(1 + \frac{\omega_d^U}{\Delta\omega^U}\right)^2\right]\right\}\sqrt{\frac{T_m^U}{2\Delta\omega^U}}\frac{1}{LT_c}$$

$$\left\{\sum_{n=0}^{N-1} a_n \int_{\sqrt{\frac{2\Delta\omega^U}{T_m^U}}\left(\gamma + (n-u)T_c - \frac{T_m^U}{4} - \frac{\omega_d^U T_m^U}{4\Delta\omega^U}\right)}^{\sqrt{\frac{2\Delta\omega^U}{T_m^U}}\left(\gamma + (n+1-u)T_c - \frac{T_m^U}{4} - \frac{\omega_d^U T_m^U}{4\Delta\omega^U}\right)} \exp\{-jt^2\}dt +$$

$$\exp\left[-j\Delta\omega^U LT_c\left(1 - \frac{2}{T_m^U}LT_c\right)\right]$$

$$\sum_{n=0}^{N-1} b_n \int_{\sqrt{\frac{2\Delta\omega^U}{T_m^U}}\left(\gamma + (L+n-u)T_c - \frac{T_m^U}{4} - \frac{\omega_d^U T_m^U}{4\Delta\omega^U}\right)}^{\sqrt{\frac{2\Delta\omega^U}{T_m^U}}\left(\gamma + (L+n+1-u)T_c - \frac{T_m^U}{4} - \frac{\omega_d^U T_m^U}{4\Delta\omega^U}\right)} \exp\{-jt^2\}dt\right\}$$

Figure 16:
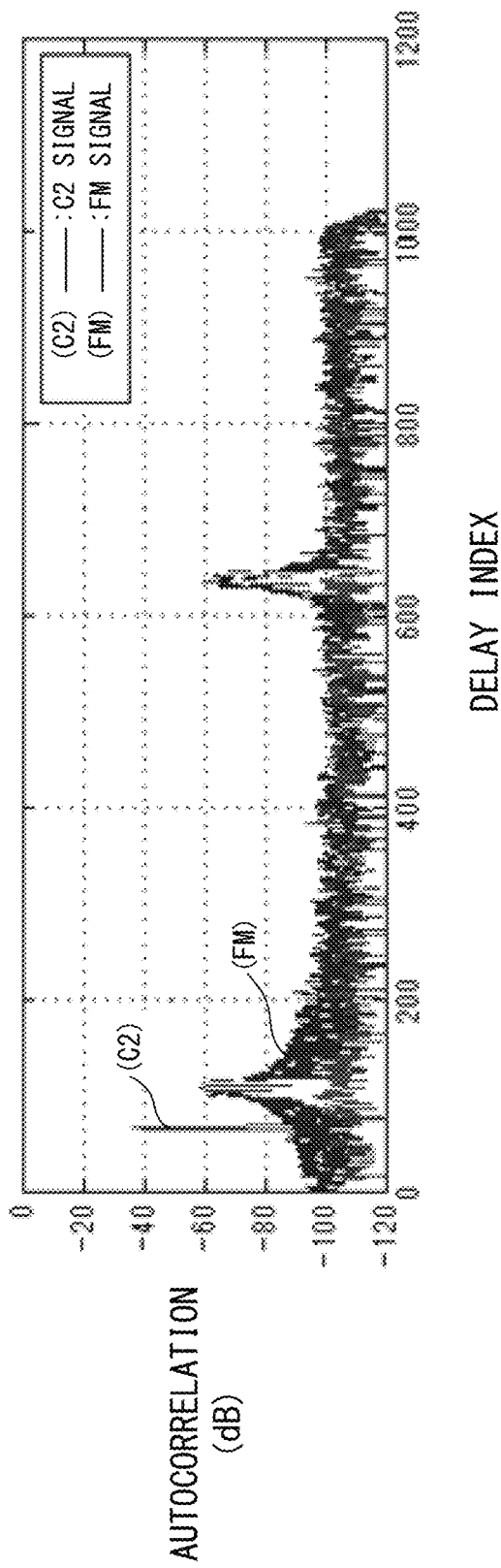
FIG. 16 illustrates an example of a desired signal and an undesired signal, for which complimentary code demodulation is performed by the detection and ranging apparatus according to the second embodiment.

FIG. 15 illustrates an example of a real part of the interference signal for which the detection and ranging apparatus according to the second embodiment performs complimentary code demodulation. FIG. 16 illustrates an example of a desired signal and an undesired signal, for which the detection and ranging apparatus according to the second embodiment performs complimentary code demodulation. In the examples illustrated in FIGS. 15 and 16, parameters of the detection and ranging apparatus 30 which is the radar of the DSSS method are set as follows. Namely, a pair of complimentary codes A and B a code length N of which is 16 (N=16), duration of a rectangular pulse on which a code is superposed $T_c^D$=2 nsec, a frame length $L^D$=1024, the number of transmission frames $M^D$=1024, and a carrier frequency shift $\Delta\omega_c$=0 MHz. Parameters of the different detection and ranging apparatus which is the radar of the FMCW method are set as follows. Namely, a single-side maximum frequency shift $\Delta\omega^U$=250 MHz, a basic cycle $T_m^U$=1 msec, and a difference of initial time $\Delta T$ between an output signal from the baseband oscillator 315 and an output signal from the baseband oscillator generating an FM signal within an interference source is 0. Additionally, specifications of the target $T^D$ and the non-target $T^U$ are set as follows similarly to FIGS. 9 and 10. Namely, a distance $d^D$ to the target $T^D$=10 m, a distance $d^U$ to the non-target $T^U$=20 m, and a velocity $v^D$ of the target $T^D$=a velocity $v^U$ of the non-target $T^U$=0 km/h.

FIG. 15 illustrates the real part of the result of correlation outputs from the primary modulator/demodulator 30C via the reception antenna 308, the low noise amplifier 309, and the second mixer 311, namely, the result obtained by joining time-division multiplexed correlation values between the interference signal and each of the codes A and B according to an elapsed time. In the second embodiment, the interference signal is an FM signal transmitted from the detection and ranging apparatus of the FMCW method. A vertical axis indicates a normalized amplitude, whereas a horizontal axis indicates time (sec) displayed as semi-log. A line (a) illustrated in FIG. 15 corresponds to the interference signal demodulated with the complimentary code A, whereas a line (b) indicates an interference signal demodulated with the complimentary code B.

FIG. 16 illustrates a final output (sometimes referred to simply as a correlation sum output hereinafter) obtained by performing complimentary code demodulation respectively for the complementary code modulation signal (C2 signal), which is a desired signal, and an FM signal, which is an undesired signal, adding each of demodulation results by performing coherent integration over all time slots, and executing an averaging process for the addition result. The desired signal is a reflection signal generated in such a way that the probe signal transmitted from the detection and ranging apparatus 30 of the DSSS method is reflected by the target $T^D$. The undesired signal is a signal that is obtained in such a way that the probe signal transmitted from the detection and ranging apparatus of the FMCW method is reflected by the non-target $T^U$ and received by the detection and ranging apparatus 30, namely, the interference signal. A vertical axis illustrated in FIG. 16 indicates an autocorrelation (dB), whereas a horizontal axis indicates a delay index. A delay time is obtained by multiplying the delay index by duration $T_c$.

As is understood from the expression (37) and FIG. 15, when an FMCW signal, which is a Continuous Wave (CW), interferes in the detection and ranging apparatus 30 using the DSSS method, which performs a detection with a correlation computation, an interference component appears in the entire section of a correlation delay index (in other words, the entire range of a measurement time). Moreover, an envelope of the interference component results in a Fresnel integral term (namely, FM) for which digital modulation is performed with the complimentary codes A and B, and the integral range of the Fresnel integration varies depending on parameters of the interference signal.

In the meantime, from a power level viewpoint, a power level of the FM signal which is an interference signal is almost decided according to a modulation index. Therefore, when an influence of a parameter such as distance attenuation and the like is ignored, the power level of the interference signal almost takes a fixed value if the modulation index of FM is decided.

Accordingly, as a method for detecting and removing the FM signal which is an interference signal, a method for setting an arbitrary threshold value based on a power level used when a desired complimentary code modulation signal is demodulated, and detecting an FM signal depending on whether or not the power level of the reception signal where an undesired FM signal is superposed on the desired complimentary code modulation signal exceeds the set arbitrary threshold value can be cited. However, the complimentary code modulation method is vulnerable to fluctuations of parameters such as a velocity (Doppler) and the like of a target, and a peak level of the desired signal is varied by an influence of these parameters. Accordingly, from the power level viewpoint, it is difficult to make a distinction between a desired complimentary code modulation signal and an undesired FM signal. Therefore, with the above described method for determining whether or not an interference signal is present by using only the threshold value of the power level as an index, it may become difficult to detect and remove an interference signal.

Therefore, as described below, the detection and ranging apparatus 30 detects and removes an FM signal which is an interference signal by using features of the FM signal for which complimentary code demodulation is performed as represented by the expression (37) and illustrated in FIGS. 15 and 16.

The reception antenna 308 receives a signal that may include an undesired interference signal in addition to a desired reflection signal (corresponding to step S103 of FIG. 3). The signal received by the reception antenna 308 passes through the low noise amplifier 309, the subtractor 310, and the second mixer 311, and complimentary code demodulation is performed by the primary modulator/demodulator 30C for the received signal with the use of the pair of complimentary codes A and B generated by the code generator 302. Then, the signal demodulated by the primary modulator/demodulator 30C is input to the detector 314 via the second distributor 312. Examples of the reception signal input to the detector 314 are the desired signal and the undesired signal which are illustrated in FIG. 16. As described above, FIG. 16 illustrates the final output obtained by performing complimentary code demodulation respectively for the desired reflection signal and the undesired interference signal, adding each of the results by performing coherent integration over all time slots, and executing an averaging process for the addition result. However, in an actual configuration of the detection and ranging apparatus 30, a reception signal where an undesired interference signal is superposed on a desired reflection signal can be input to the detector 314.

The detector 314 detects the interference signal according to the input reception signal (corresponding to step S104). Specifically, when an FM modulation input signal that causes an interference signal is a signal that linearly changes, a correlation sum output from the primary modulator/demodulator 30C takes the form of a Fresnel function with respect to a delay index. Accordingly, the detector 314 detects the interference signal by making a pattern matching between the correlation sum output from the primary modulator/demodulator 30C and the Fresnel function. Moreover, when the FM modulation input signal that causes the interference signal is a triangular wave, it is understood from the integral terms within the expressions (34) and (36) that a plurality of correlation sums appear respectively corresponding to an up-chirp section and a down-chirp section. Accordingly, the detector 314 can identify a type of the input modulation signal of the interference signal based on the number of Fresnel functions.

When the interference signal is detected by the detector 314 (corresponding to "YES" in step S104), the detection and ranging apparatus 30 identifies specifications of the interference signal by using a signal received while the transmission of a probe signal is being stopped (corresponding to step S106). The specifications of the interference signal in the second embodiment include a single-side maximum frequency shift $\Delta\omega^U$ of the FM signal which is the interference signal, a basic cycle $T_m^U$, and a difference of initial time $\Delta T$ between an output signal from the baseband oscillator 315 and an output signal of the baseband oscillator generating an FM signal within the apparatus which is an interference source.

Specifically, the CPU 301 initially turns off the output of the code generator 302, and stops the transmission of the probe signal from the transmission antenna 307 (corresponding to step S105).

The reception antenna 308 receives a signal that may include an interference signal while the transmission of the probe signal is being stopped. The signal received by the reception antenna 308 is input to the fourth mixer 320 via the low noise amplifier 309, the subtractor 310, the second mixer 311, the primary modulator/demodulator 30C, and the concatenator 322. In the state where the transmission of the probe signal is being stopped, the subtractor 310, the second mixer 311, and the concatenator 322 function as a through line that output the input signal without any change. Moreover, the primary modulator/demodulator 30C functions as a distributor that outputs the input signal to the second distributor 312 and the concatenator 322.

In the meantime, the CPU 301 outputs a control signal to the baseband oscillator 315. The baseband oscillator 315 outputs a modulation signal, which type (triangular wave or the like) is identified by the detector 314, with a specified single-side maximum frequency shift $\Delta\omega^U$ and basic cycle $T_m^U$ according to the control signal received from the CPU 301. The modulation signal output from the baseband oscillator 315 is input to the second radio frequency oscillator 317 via the variable delay circuit 316. The second radio frequency oscillator 317 outputs a radio frequency signal for which FM modulation is performed with the modulation signal output from the baseband oscillator 315. The FM signal output from the second radio frequency oscillator 317 bypasses the third distributor 318 and the third mixer 319 (denoted as an arrow for the sake of convenience in FIG. 13 although a switch is actually used for the bypass), and is input to the fourth mixer 320.

The fourth mixer 320 generates a signal equivalent to a beat signal in the radar of the FMCW method by mixing the reception signal input via the concatenator 322 and the FM signal output from the second radio frequency oscillator 317. The reception signal mixed by the fourth mixer 320 is input to the CPU 301 via the fast Fourier transform circuit 321.

The CPU 301 monitors a power level of the input reception signal. The CPU 301 determines whether or not a maximum value of the monitored power level of the reception signal exceeds a specified threshold value. When the maximum value of the monitored power level of the reception signal does not exceed the specified threshold value, the CPU 301 transmits a control signal to the baseband oscillator 315, and causes the baseband oscillator 315 to change the values of the single-side maximum frequency shift $\Delta\omega^U$ and the basic cycle $T_m^U$. Moreover, the CPU 301 transmits a control signal to the variable delay circuit 316, and causes the variable delay circuit 316 to change the value of the delay time $\Delta T$ given to the output signal of the baseband oscillator 315 in order to synchronize the output signal of the baseband oscillator 315 and the output signal of the baseband oscillator generating an FM signal within the interference source (The change of the delay time is equivalent to a change of a phase of the output signal of the baseband oscillator 315). Then, the CPU 301 repeats the above described process until the maximum value of the monitored power level of the reception signal exceeds the specified threshold value. In contrast, when the maximum value of the monitored power level of the reception signal exceeds the specified threshold value, the CPU 301 identifies specifications of the interference signal by identifying the values of $T_m^U$, $\Delta\omega^U$, and $\Delta T$, which are set when the maximum value exceeds the threshold value (Since the identification of $\omega_c^U$ may be made simultaneously with that of $\Delta\omega^U$, $\omega_c^U$ is not particularly referred to as the specifications. The same applies to the following explanation).

As described above, when the specifications of the interference signal are identified, the CPU 301 turns on the output of the code generator 302, and causes the transmission of the probe signal from the transmission antenna 307 to be restarted (corresponding to step S107). The reception antenna 308 receives a signal including an interference signal along with a reflection signal which is a desired signal, after the transmission of the probe signal is restarted. The signal received by the reception antenna 308 is input to the primary modulator/demodulator 30C via the low noise amplifier 309, the subtractor 310, and the second mixer 311. At this time, the subtractor 310 functions as a through line that outputs the input signal without any change.

The primary modulator/demodulator 30C time-division multiplexes and outputs results of a correlation computation (correlation values) performed between the input reception signal and the pair of complimentary codes A and B for each code slot. The concatenator 322 concatenates the correlation values output from the primary modulator/demodulator 30C in synchronization with a time slot $T_u^D$, and shapes the concatenated value as a temporal waveform (see FIG. 15).

As is understood from the expression (37), the signal having the above described temporal waveform where the outputs of demodulation performed with the codes A and B are concatenated is a signal acquired by up-sampling (cutting) an FMCW signal, for which digital modulation is performed with each of the codes A and B, in a section $T_u^D$. Accordingly, by performing FM modulation for this signal with the use of the identified specifications of the interference signal, a delay amount $\tau^U$ of the interference signal can be identified. Meanwhile, it is desirable that a code length of codes A and B is short to reduce the phase alternation caused by digital modulation.

Figure 17A:
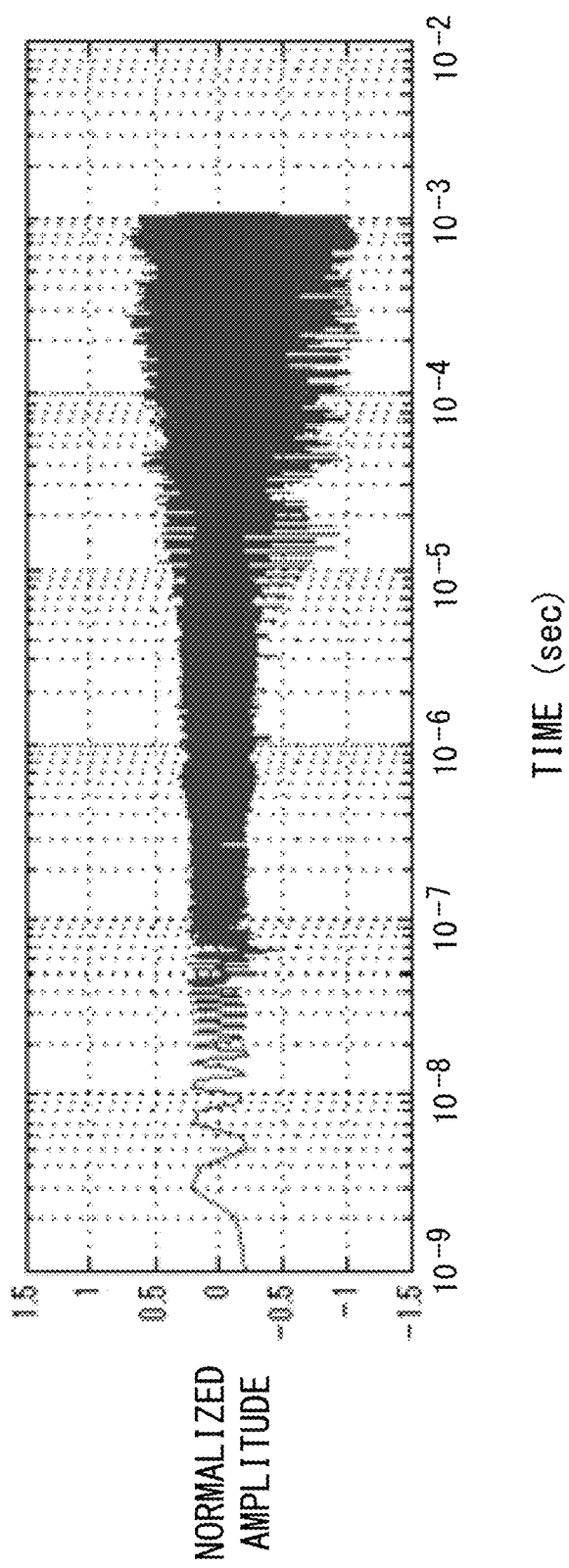
FIG. 17A illustrates an example of a real part of an output signal from a concatenator of the second embodiment.
Figure 18A:
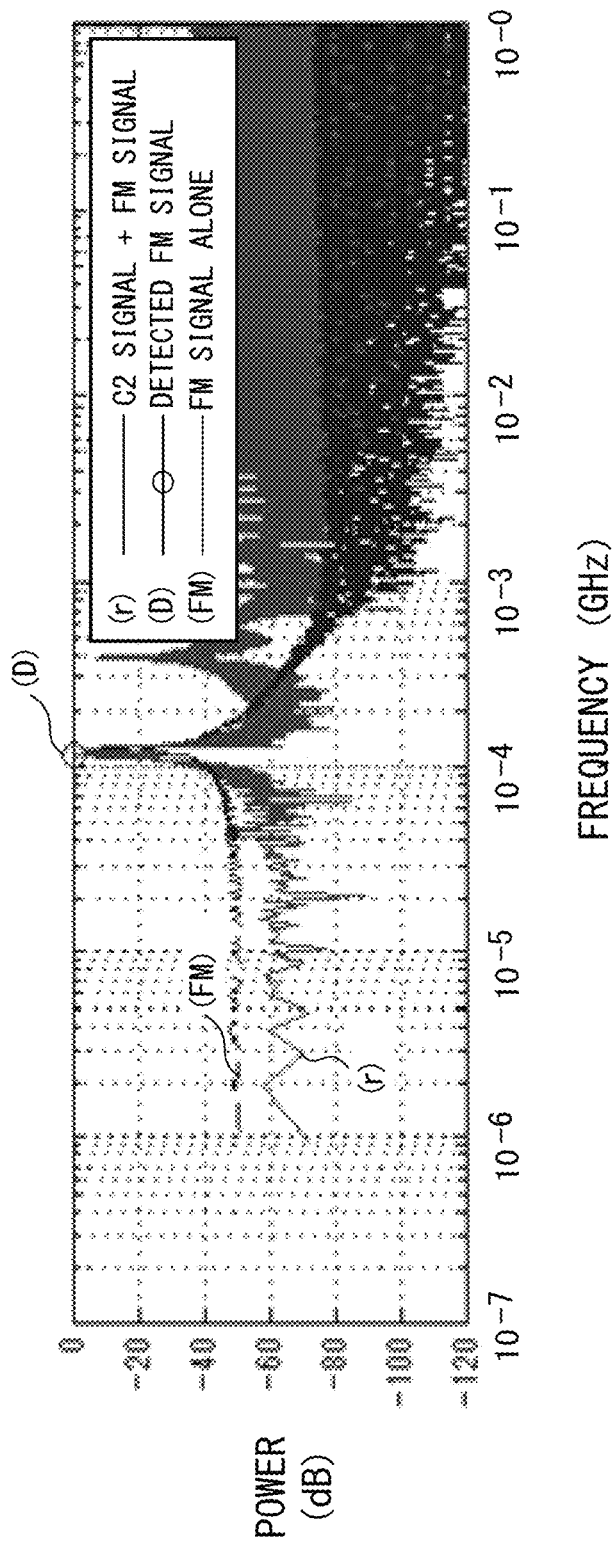
FIG. 18A illustrates an example of an FFT output after FM demodulation is performed for the signal illustrated in FIG. 17A with specifications of an interference signal.

FIGS. 17A and 17B respectively illustrate examples of a real part of the output signal from the concatenator in the second embodiment. FIG. 18A illustrates an example of an FFT output after FM demodulation is performed for the signal illustrated in FIG. 17A with specifications of an interference signal, whereas FIG. 18B illustrates an example of an FFT output after FM demodulation is performed for the signal illustrated in FIG. 17B with specifications of an interference signal.

In FIGS. 17A, 17B, 18A, and 18B, specifications of the detection and ranging apparatus 30 are as follows. Namely, a pair of complimentary codes A and B a code length N of which is 16 (N=16), duration of a rectangular pulse on which a code is superposed $T_c^D$=2 nsec, a frame length $L^D$=1024, and the number of transmission frames $M^D$=1024. However, a carrier frequency shift $\Delta\omega_0$ of the detection and ranging apparatus 30 is 0 MHz in FIGS. 17A and 18A, whereas the carrier frequency shift $\Delta\omega_c$ of the detection and ranging apparatus 30 is 50 MHz in FIGS. 17B and 18B. Moreover, in FIGS. 17A, 17B, 18A, and 18B, specifications of a different detection and ranging apparatus that causes an interference signal are as follows. Namely, a single-side maximum frequency shift $\Delta\omega^U$=250 MHz, a basic cycle $T_m^U$=1 msec, and a difference of initial time $\Delta T$ between an output signal from the baseband oscillator 315 and an output signal from the baseband oscillator generating an FM signal within the interference source is 0 (the same phase). Specifications of the target $T^D$ and the non-target $T^U$ are set as follows similarly to FIGS. 15 and 16. Namely, a distance $d^D$ to the target $T^D$=10 m, a distance $d^U$ to the non-target $T^U$=20 m, and a velocity $v^D$ of the target $T^D$=a velocity $v^U$ of the non-target $T^U$=0 km/h.

Figure 18B:
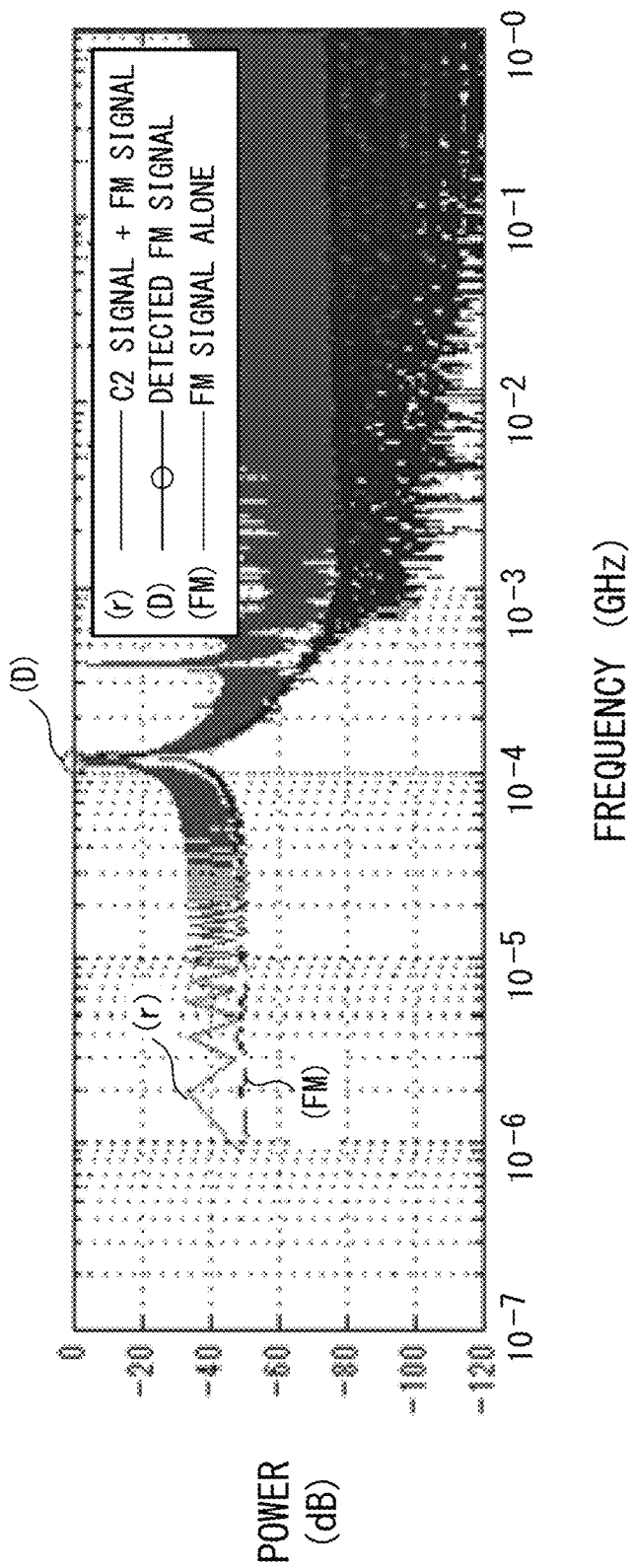
FIG. 18B illustrates an example of an FFT output after FM modulation is performed for the signal illustrated in FIG. 17B with specifications of an interference signal.

As indicated by a line (r) illustrated in FIGS. 18A and 18B, a peak appears, for each PRI, in the FFT output after signals obtained by performing complimentary code demodulation for a reception signal including a desired complimentary code modulation signal and an undesirable FM signal are concatenated and FM demodulation is performed for the concatenated signal with the specifications of the interference signal. Moreover, as indicated by a symbol (D), a peak of a power level which appears at the lowest position of the frequency corresponds to a result of demodulation performed by the apparatus of the interference source for the FM signal which is the interference signal. Accordingly, it can be understood that a delay amount $T^U$ of the interference signal is identifiable by performing FM demodulation for the signal illustrated in FIG. 17A or 17B with the use of the specifications of the interference signal, which are identified with the above described procedures.

As described above, when the specifications of the interference signal and the delay amount $\tau^U$ of the interference signal are identified, the CPU 301 generates a copy of the interference signal modulated with the FMCW method by using the identified specifications and delay amount of the interference signal. Namely, the baseband oscillator 315 generates a modulation signal based on the identified $T_m^U$ and $\Delta\omega^U$ according to an instruction from the CPU 301. Moreover, the variable delay circuit 316 delays the modulation signal generated by the baseband oscillator 315 by the identified $\Delta T$ according to an instruction from the CPU 301. The second radio frequency oscillator 317 outputs a radio frequency signal for which FM modulation is performed with the modulation signal delayed by $\Delta T$. The FM signal generated by the second radio frequency oscillator 317 is input to the subtractor 310 by the third distributor 318 after the identified delay amount $\tau^U$ is given by a variable delay circuit not illustrated.

To the subtractor 310, the copy of the interference signal, which is input via the third distributor 318, and the reception signal received by the reception antenna 308 are input. The subtractor 310 removes an interference signal component from the reception signal by subtracting the input copy of the interference signal from the input reception signal (corresponding to step S109).

The reception signal from which the interference signal is removed by the subtractor 310 is input to the second mixer 311. The reception signal input to the second mixer 311 is mixed with a carrier signal generated by the first radio frequency oscillator 303, and down-converted into a baseband. The baseband reception signal is input to the primary modulator/demodulator 30C. The primary modulator/demodulator 30C outputs to the signal processing circuit 313 via the second distributor 312 a final output, as a demodulation result, obtained by calculating a correlation value between the input reception signal and each of the complimentary codes A and B, sums correlation values, adding the result by performing coherent integration for a the result over all time slots, and executing an averaging process for the addition result. The signal processing circuit 313 calculates feature amounts of the target $T^D$ by using the above described output.

As described above, with the detection and ranging apparatus 30 according to the second embodiment, an interference signal can be detected from a reception signal, and the detected interference signal can be removed from the reception signal.

The above described interference signal removing process executed by the detection and ranging apparatus 30 is merely one example for explaining the embodiment, and various changes can be made.

For example, in the above provided explanation, the subtractor 310 subtracts an interference signal from a reception signal, and an interference signal component is thereby removed from the reception signal. However, instead of generating the copy of the interference signal and subtracting it from the reception signal, the detection and ranging apparatus 30 may be configured to reduce a power level of the interference signal by setting specifications of an FM signal generated within the detection and ranging apparatus 30 (for example, set $\Delta T=T_m^U/2$) so that an FM signal component within the reception signal is spread on a frequency axis based on the identified specifications of the interference signal. Also with such a configuration, the interference signal can be removed from the reception signal. Moreover, in a case where a modulation cycle of a apparatus which is an interference source is short, or in a case where a code length of the detection and ranging apparatus 30 is long, the power spreads up to a low frequency side of a frequency area. Especially, it is difficult to identify specifications in the latter case. Accordingly, in such a case, the detection and ranging apparatus may be configured to identify the apparatus which is the interference source by determining whether or not interference is present based on a noise floor of an output to the signal processing circuit 313, and changing the code length on the side of the detection and ranging apparatus 30.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detection and ranging apparatus, comprising:
a probe signal generating unit configured to generate a probe signal according to a first modulation method;
a transmitting unit configured to transmit the probe signal generated by the probe signal generating unit;
a receiving unit configured to receive a signal including at least one of a reflection signal generated in such a way that the probe signal transmitted from the transmitting unit is reflected by a target and an interference signal demodulated according to a second modulation method;
a demodulating unit configured to demodulate the reception signal received by the receiving unit;
an interference signal identifying unit configured to identify specifications and a delay amount of the interference signal from the signal demodulated by the demodulating unit; and
an interference signal removing unit configured to remove the interference signal within the reception signal by using the specifications and the delay amount of the interference signal which are identified by the interference signal identifying unit.

2. The detection and ranging apparatus according to claim 1, further comprising
a controlling unit configured to instruct the transmitting unit to stop and restart a transmission of the probe signal, wherein
the demodulating unit demodulates, according to a demodulation method corresponding to the second modulation method, the reception signal which is received by the receiving unit while the transmitting unit is stopping the transmission of the probe signal according to an instruction of the controlling unit, and
the interference signal identifying unit identifies the specifications of the interference signal from the signal demodulated by the demodulating unit.

3. The detection and ranging apparatus according to claim 2, wherein
stopping and restarting the transmission of the probe signal by the controlling unit include controlling a decrease and increase in transmission power level of the probe signal transmitted from the transmitting unit by the controlling unit.

4. The detection and ranging apparatus according to claim 2, wherein
the first modulation method is a frequency modulation continuous wave method, and the second modulation method is a direct spectrum spreading signal method using a pair of complimentary codes as codes for modulation,
the demodulating unit demodulates, according to a demodulation method corresponding to frequency modulation method, a reception signal which is received by the receiving unit while the transmitting unit is stopping the transmission of the probe signal, and
the interference signal identifying unit identifies a carrier frequency and a pulse repetition interval of the interference signal from a signal which is obtained by performing fast Fourier transform of the demodulation signal demodulated according to the demodulation method corresponding to the frequency modulation method.

5. The detection and ranging apparatus according to claim 4, wherein
the demodulating unit demodulates the reception signal received by the receiving unit while the transmitting unit is stopping the transmission of the probe signal by using the identified carrier frequency, extracts the demodulated signal for each identified pulse repetition interval, and performs complimentary code demodulation for the extracted signal while changing at least one of a pulse time width and the pair of complimentary codes, the pulse time width being a duration of a rectangular pulse on which the complimentary code is superposed, and
the interference signal identifying unit determines whether or not a correlation peak is detected from the signal for which the complimentary code demodulation is performed by the demodulating unit, and identifies at least one of the pulse time width and the pair of complimentary codes, which is used for the complimentary code demodulation for the signal from which the correlation peak is detected.

6. The detection and ranging apparatus according to claim 4, wherein
the demodulating unit adjusts a passband width of a reception signal based on the pulse repetition interval identified by the interference signal identifying unit, and demodulates only the reflection signal included in the reception signal.

7. The detection and ranging apparatus according to claim 1, further comprising
a controlling unit configured to instruct the transmitting unit to stop and restart a transmission of the probe signal, wherein
the demodulating unit demodulates the reception signal which is received by the receiving unit after the transmitting unit restarts the transmission of the probe signal according to an instruction of the controlling unit, and the interference signal identifying unit identifies the delay amount of the interference signal from the signal demodulated by the demodulating unit.

8. The detection and ranging apparatus according to claim 7, wherein
the interference signal removing unit generates a copy of an interference signal by using the identified specifications and delay amount which are identified by the interference signal identifying unit, and removes the interference signal within the reception signal by subtracting the generated copy of the interference signal from a reception signal which is received by the receiving unit after the transmission of the probe signal is restarted.

9. The detection and ranging apparatus according to claim 1, wherein
the first modulation method is a direct spectrum spreading signal method that uses a pair of complimentary codes as codes for demodulation, and the second modulation method is a frequency modulation continuous wave method,
the demodulating unit performs complimentary code demodulation for the reception signal received by the receiving unit, and
the interference signal detecting unit identifies the interference signal as a frequency modulation signal from a correlation output pattern of the signal for which the complimentary code demodulation is performed by the demodulating unit.

10. The detection and ranging apparatus according to claim 9, wherein
the demodulating unit demodulates, according to a demodulation method corresponding to frequency modulation method, a reception signal received by the receiving unit while the transmitting unit is stopping the transmission of the probe signal while changing each value of a single-side maximum frequency shift, a basic cycle, and a phase, and
the interference signal identifying unit determines whether or not the signal demodulated by the demodulating unit exceeds a certain threshold value, and identifies the each value of the single-side maximum frequency shift, the basic cycle, and the phase which are used to demodulate the signal that exceeds the certain threshold value.

11. The detection and ranging apparatus according to claim 10, further comprising
a controlling unit configured to instruct the transmitting unit to stop and restart a transmission of the probe signal, wherein
the demodulating unit outputs correlation values between a reception signal received by the receiving unit and one of the pair of complimentary codes for each slot occupied by the one of the pair of complimentary codes after the transmitting unit restarts the transmission of the probe signal according to an instruction of the controlling unit, and
the interference identifying unit concatenates the correlation values output from the demodulating unit along a time axis, demodulates the concatenated signal with a demodulation method corresponding to frequency modulation method by using the each value of the single-side maximum frequency shift, the basic cycle, and the phase which are identified by the interference signal identifying unit, and identifies a delay amount of the interference signal from the demodulated signal demodulated with the demodulation method corresponding to the frequency modulation method.

* * * * *